(12) United States Patent
Topliss

(10) Patent No.: US 7,974,025 B2
(45) Date of Patent: Jul. 5, 2011

(54) SHAPE MEMORY ALLOY ACTUATION APPARATUS

(75) Inventor: Richard Topliss, Trumpington (GB)

(73) Assignee: Cambridge Mechatronics Limited, Cambridge (GB)

( * ) Notice: Subject to any disclaimer, the term of this patent is extended or adjusted under 35 U.S.C. 154(b) by 62 days.

(21) Appl. No.: 12/596,925

(22) PCT Filed: Apr. 22, 2008

(86) PCT No.: PCT/GB2008/001402
§ 371 (c)(1),
(2), (4) Date: Nov. 20, 2009

(87) PCT Pub. No.: WO2008/129291
PCT Pub. Date: Oct. 30, 2008

(65) Prior Publication Data
US 2010/0074608 A1    Mar. 25, 2010

(30) Foreign Application Priority Data

Apr. 23, 2007 (GB) .................................. 0707788.6
May 15, 2007 (GB) .................................. 0709311.5
Jul. 27, 2007 (GB) .................................. 0714718.4

(51) Int. Cl.
G02B 7/02 (2006.01)
(52) U.S. Cl. .................. 359/823; 359/824; 359/820
(58) Field of Classification Search .................. 359/820, 359/823, 824, 831, 554, 557; 396/52, 55, 396/72, 132, 177, 418; 60/527–529; 348/65, 348/340; 310/306
See application file for complete search history.

(56) References Cited

U.S. PATENT DOCUMENTS

| | | | |
|---|---|---|---|
| 4,490,976 A * | 1/1985 | Johnson | 60/527 |
| 4,977,886 A | 12/1990 | Takehana et al. | 60/151 |
| 5,459,544 A | 10/1995 | Emura | 354/245 |
| 6,307,678 B2 * | 10/2001 | Kosaka et al. | 359/557 |
| 6,434,333 B2 * | 8/2002 | Tanaka et al. | 396/132 |
| 6,516,146 B1 | 2/2003 | Kosaka | 396/55 |
| 6,574,958 B1 | 6/2003 | MacGregor | 60/527 |

(Continued)

FOREIGN PATENT DOCUMENTS

EP    1 914 422 A1    4/2008
(Continued)

OTHER PUBLICATIONS

U.S. Appl. No. 12/295,382, filed Sep. 30, 2008.
(Continued)

*Primary Examiner* — Mohammed Hasan
(74) *Attorney, Agent, or Firm* — Nixon & Vanderhye P.C.

(57) ABSTRACT

A miniature camera lens actuation apparatus employs an SMA actuator comprising SMA wire to move a camera lens element. To provide autofocus, the SMA actuator is heated across its range of contraction and the resistance at which the focus is at an acceptable level is stored. To combat hysteresis, there is performed a flyback in which the SMA actuator is cooled, before heating the SMA actuator to the stored resistance. The stored resistance is adjusted to combat creep caused by non-linear heating of the SMA actuator. The SMA wire has conductive material extending along on a portion of the SMA wire which extends from a member connected to the SMA wire and being in electrical connection with the SMA wire in order to short out that portion of the SMA wire to reduce creep. Additional material is applied over the SMA wire and the member to reduce fatigue.

20 Claims, 10 Drawing Sheets

U.S. PATENT DOCUMENTS

| | | |
|---|---|---|
| 7,295,389 B2 | 11/2007 | Ohtsuka et al. ............... 359/819 |
| 2001/0002226 A1 | 5/2001 | Tanaka et al. ................ 396/440 |
| 2001/0025477 A1 | 10/2001 | Hara et al. .................. 60/39.02 |
| 2006/0048511 A1 | 3/2006 | Everson et al. ................. 60/527 |
| 2006/0109570 A1 | 5/2006 | Ohtsuka et al. ............... 359/819 |
| 2006/0150627 A1 | 7/2006 | Oohara ........................... 60/528 |
| 2006/0209195 A1 | 9/2006 | Goto ............................. 348/357 |
| 2006/0272328 A1 | 12/2006 | Hara et al. ..................... 60/527 |
| 2007/0034818 A1 | 2/2007 | Grummon ....................... 251/11 |
| 2008/0278030 A1 | 11/2008 | Hara et al. ..................... 310/307 |
| 2008/0278590 A1 | 11/2008 | Tanimura et al. ........ 348/208.99 |
| 2008/0282696 A1 | 11/2008 | Wada et al. ..................... 60/528 |

FOREIGN PATENT DOCUMENTS

| | | |
|---|---|---|
| JP | 09-127398 | 5/1997 |
| JP | 2002-130114 | 5/2002 |
| JP | 2002/250272 | 9/2002 |
| JP | 2004-38058 | 2/2004 |
| JP | 2005-275270 | 10/2005 |
| JP | 2005/297437 | 10/2005 |
| JP | 2007-315352 | 12/2007 |
| WO | WO 94/19051 | 9/1994 |
| WO | WO 01/47041 A2 | 6/2001 |
| WO | WO 02/103451 A1 | 12/2002 |
| WO | WO 2004/113723 A1 | 12/2004 |
| WO | WO 2005/026539 A2 | 3/2005 |
| WO | WO 2005/075823 A1 | 8/2005 |
| WO | WO 2005/093510 A2 | 10/2005 |
| WO | WO 2006/105588 A1 | 10/2006 |
| WO | WO 2007/018086 A1 | 2/2007 |
| WO | WO 2007/113478 A1 | 10/2007 |

OTHER PUBLICATIONS

U.S. Appl. No. 12/525,906, filed Nov. 13, 2009.

* cited by examiner

SHAPE MEMORY ALLOY ACTUATION APPARATUS

This application is the U.S. national phase of International Application No. PCT/GB2008/001402 filed 22 Apr. 2008, which designated the U.S. and claims priority to UK Application Nos. GB 0707788.6, filed 23 Apr. 2007; GB 0709311.5 filed 15 May 2007; and GB 0714718.4 filed 27 Jul. 2007; the entire contents of each of which are hereby incorporated by reference.

The present invention relates to a shape memory alloy (SMA) actuation apparatus using SMA material as an actuator to drive movement of a movable element.

The present invention has particular application to actuation of a camera lens element, for example of the type used in a miniature camera which may be employed in a portable electronic device such as a mobile telephone or a mobile digital data processing and/or transmitting device.

BACKGROUND OF THE INVENTION

In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied. Similar considerations apply to actuation arrangements for a wide range of other small objects.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electro-active devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element.

The use of SMA material as an actuator for a small object such as the camera lens element of a miniature camera provides the advantages of being intrinsically linear, providing a high power per unit mass, being a low cost commodity item and being a relatively small component.

BREIF DESCRIPTION OF THE INVENTION

The present invention is applicable to an SMA actuation arrangement for driving movement of a camera lens in a camera. However, similar considerations apply to actuation arrangements for a wide range of other small movable elements and so the present invention is equally applicable to such other applications.

The first aspect of the present invention is concerned with controlling the position of the movable element based on a signal which varies with the position of the movable element. For example, where the movable element is a camera lens element, auto-focussing may be applied using a signal which is a measure of the quality of focus based on the image signal output by the image sensor.

In the case of using an SMA actuator to drive movement of the movable element, there is a considerable problem of providing accurate, repeatable control. This results from hysteresis between the applied current and the actual position of the camera lens element. Whilst the change of length of the SMA actuator is dependent on the temperature, there are nonetheless problems in implementing the control.

It is difficult to accurately determine the temperature which is dependent on not only the applied current passing through the SMA actuator but also on the cooling of the SMA actuator which occurs at a varying rate depending on the ambient conditions. Thus, the temperature cannot be accurately determined from the known applied current.

Even assuming hypothetically that there was accurate knowledge of the temperature, there is hysteresis in the variation of the length of the SMA actuator and the temperature. In particular, the active temperature range over which the material transforms from the martensite phase to the austenite phase during heating occurs at a higher temperature than the temperature range over which the SMA actuator transforms from the austenite phase to the martensite phase during cooling. As a result of this hysteresis, after a cycle of heating and cooling the SMA actuator it becomes difficult to know the current state and hence length of the SMA actuator itself.

Whilst such problems with the control of SMA actuator are in general terms known, the problems are particularly acute where the SMA actuator is used to drive movement of a small element, for example a camera lens element particularly for a miniature camera for example in which the lens(es) of the camera lens element have a maximum diameter of 10 mm. In this case, the resolution of the positional control must be very fine because the overall range of travel of the camera lens element is low and yet the lens element must be controlled to a high degree of accuracy to provide proper focussing.

The first aspect of the present invention is concerned with providing accurate control of an SMA actuation arrangement for driving a camera lens element given these problems.

According to a first aspect of the present invention, there is provided a method of controlling an SMA actuator apparatus comprising an SMA actuator arranged on contraction due to heating to drive movement of a movable element, in which method heating of the SMA actuator is performed by passing a current through the SMA actuator, the method comprising:

a first heating step of heating the SMA actuator from a state in which it is not contracted, whilst monitoring the resistance of the SMA actuator, until a first maximum in the resistance of the SMA actuator is detected, the resistance value of the first maximum being stored; a scan step of further heating the SMA actuator to cause the SMA actuator to contract, whilst monitoring a signal which varies with the position of the movable element, the value of the resistance of the SMA actuator when the signal is at an acceptable level being measured and stored; a cooling step of cooling the SMA actuator back into a state in which it is not contracted; a second heating step of heating the SMA actuator, whilst monitoring the resistance of the SMA actuator, until a second maximum in the resistance of the SMA actuator is detected; deriving a target resistance value equal to the stored value of the resistance of the SMA actuator when the signal is at an acceptable level adjusted by an adjustment which is determined on the basis of the resistance values of the first and second maximums; and a seek step of further heating the SMA actuator, whilst monitoring the resistance of the SMA actuator, until the monitored resistance value reaches the target resistance value. Further according to the first aspect of the present invention, there is provided a control system implementing a similar method.

The first aspect of the present invention utilizes the measured resistance of the SMA actuator as a measure of the length of the SMA actuator and hence the position of the movable element. In particular, during the seek step, the SMA actuator is heated until the resistance of the SMA actuator reaches the target resistance value, for example using a feedback control technique. The use of resistance has a considerable advantage of being accurate and being straightforward to implement by the provision of additional electronic components supplementing the control circuit needed to provide the current which heats the SMA actuator. In contrast, direct measurement of the position of the movable element requires a position sensor which is bulky in the context of a miniature device. Also, measurement of the temperature of the SMA actuator is difficult to implement with sufficient accuracy.

However, it has been appreciated that the resistance of the SMA actuator does not by itself provide an accurate measure of position because there is hysteresis between the measured resistance and the actual position. This problem of hysteresis has been overcome by use of a flyback technique. In particular, the value of the resistance of the SMA actuator when the signal which varies with the position of the movable element is at an acceptable level is stored during a preliminary scan step and the target resistance value is derived therefrom. However, the SMA actuator is returned to the target resistance value only after a flyback step during which the SMA actuator is cooled to be returned to a state in which it is not contracted. Thus in both the scan step and the seek step, the SMA actuator is heated. As a result, the variation of the resistance of the SMA actuator varies with the length of the SMA actuator in the same repeated manner so that the flyback technique makes it possible to return the camera lens element to the same position.

However, it has been further appreciated that the accuracy of the control can be further improved by adjusting the stored value of the resistance of the SMA actuator when the signal is at an acceptable level to derive the target resistance value rather than by using the stored value of the resistance of the SMA actuator itself as the target resistance value. This is for the following reason. Although the stored value of the resistance of the SMA actuator provides for reasonably accurate control, it has been appreciated that some degree of inaccuracy arises from creep. That is to say over time the degree of contraction of the SMA actuator at a given resistance is subject to creep, or conversely the resistance of the SMA actuator at a given degree of resistance is subject to creep. It is hypothesized that the source of the creep is as follows.

In any actual physical implementation, the SMA actuator has thermal dead-spots which do not heat as rapidly as the bulk of the SMA actuator. Typically, these thermal dead-spots are caused by other material with a significant thermal mass near the SMA actuator which prevents portions of the SMA actuator from heating up, most notably the members which make a mechanical and/or electrical connection to the SMA actuator, which are typically crimps in the case of SMA wire. The thermal dead-spots take much longer to heat up than the remainder of the SMA actuator. In the control cycle in accordance with the first aspect of the invention including a scan step a cooling step and a seek step, typically these thermal dead-spots heat up between the scan step and the seek step but without ever reaching a sufficient temperature to contract themselves. As a result the thermal dead-spots have an increased resistance in the seek step, as compared to the scan step, which increased resistance contributes to the overall monitored resistance of the SMA actuator but without the thermal dead-spots contributing any contraction to the SMA actuator. This is a source of inaccuracy if the monitored resistance is used to control the heating of the SMA actuator. In effect, when the resistance of the thermal dead-spots increases, extra heating of the SMA actuator is applied to decrease the overall resistance, but this extra heating causes contraction which is unnecessary as the increase in resistance of the thermal dead-spots does not signify any reduction in the contraction of the SMA actuator.

This problem is solved by deriving a target resistance value equal to the stored value of the resistance of the SMA actuator when the signal is at an acceptable level adjusted by an adjustment which is determined on the basis of the resistance values of the first and second maximums. Any creep between the scan step and seek step, as described above, will result in the maximum of the resistance value detected at the beginning of the seek step being greater than the maximum of the resistance value detected at the beginning of the scan step due to the increased resistance of the thermal dead-spots. Therefore, the difference between the maximums is indicative of the creep in resistance and can be used as the basis for adjusting the stored resistance value to derive the target resistance value used in the seek step.

The adjustment may be calculated with a most significant term equal to the resistance value of the second maximum minus the resistance value of the first maximum because this represents the creep in resistance between the scan step and the seek step.

However, the maximums are detected at the beginning of the scan and seek steps and there may be further creep over the course of the seek step. To compensate for this the adjustment may be calculated with further term which varies across the range of contraction of the SMA actuator.

The second aspect of the present invention is concerned with handling creep when controlling an SMA actuator on the basis of its resistance. Use resistance of the SMA actuator as a measure of the position has several advantages. One considerable advantage is being accurate and being straightforward and compact to implement, simply by providing additional electronic components supplementing the control circuit needed to provide the current which heats the SMA actuator. In contrast, direct measurement of the position of the movable element requires a position sensor which is bulky in the context of a miniature device. Also, measurement of the temperature of the SMA actuator is difficult to implement with sufficient accuracy.

However, it has been appreciated that over time the degree of contraction of the SMA actuator at a given resistance is subject to creep, or conversely the resistance of the SMA actuator at a given degree of resistance is subject to creep.

According to a second aspect of the present invention, there is provided an SMA actuator comprising:

an SMA wire;

a member mechanically connected to the SMA wire; and electrically conductive material extending along on a portion of the SMA wire which is in contact with, and extends from, the member and being in electrical connection with the SMA wire, the conductive material having a resistance per unit length less than the resistance per unit length of the SMA wire.

The conductive material reduces creep. This is for the following reasons.

It is hypothesized that a major source of the creep is as follows. The SMA wire is mechanically and electrically connected to a member, typically by crimping. When a current is passed through the SMA wire to cause heating, the member sinks heat from the SMA wire. Thus a portion of the SMA wire extending away from the member forms a thermal dead-spot which heats more slowly than the bulk of the SMA wire. There will be periods when the SMA actuator is heated from cold that the thermal dead-spot contributes to the overall monitored resistance of the SMA actuator but without contributing any contraction to the SMA actuator. This is a source of creep if the monitored resistance is used to control the heating of the SMA actuator. For example in practice it may be observed that if the control system attempts to maintain the resistance constant then there is creep in the actual position of the movable object.

The problem of the portion of the SMA wire extending away from the member forming a thermal dead-spot is reduced by the provision of electrically conductive material extending along that portion of the SMA wire. The conductive material is in electrical connection with the SMA wire and has a resistance per unit length less than the resistance per unit length of the SMA wire. Consequently the conductive material effectively acts as a short to the current flow through the end portion of the wire. As a result that portion of the wire is not substantially heated and therefore does not contract. Similarly that portion of the wire does not substantially contribute to the monitored resistance of the SMA wire. Thus the creep arising from this portion of the wire is significantly reduced.

Advantageously, the conductive material has a resistance per unit length less than the resistance per unit length of the SMA wire by at least an order of magnitude. Such low resistances may be achieved by selecting a conductive material which has low resistivity, for example at least 50 times less than the resistivity of the material of the SMA wire. This is easily achievable with many common metals, for example silver, gold or copper. The conductive material may advantageously be applied as a coating. Resistivity of the common SMA material Nitinol is of the order of 160 to 5000 times higher than that of ordinary metals. Even assuming the lowest resistivity ratio, a coating thickness of less than one-thirtieth of the wire radius should suffice to stabilise the resistance in the end portion.

The third aspect of the present invention is concerned with reducing failure of an SMA actuator comprising SMA wire. In many applications including cameras, it is desirable for the SMA actuator to have a long life time, typically of the order of hundreds of thousands of cycles.

According to a third aspect of the present invention, there is provided an SMA actuator comprising:

an SMA wire;

a member mechanically connected to the SMA wire; and additional material applied over the SMA wire in contact with the member and the SMA wire, the additional material reducing mechanical stresses in the SMA wire.

It has been appreciated that when SMA wire is mechanically connected to member, for example by crimping, and operated repeatedly over a large number of cycles, one of the main causes of failure is fatigue in the SMA material at or close to the connection to member leading to early fracture of the SMA material. This can result in a proportion of manufactured SMA actuators failing before their desired lifetime. This is a particular problem as the thickness of the SMA actuator is reduced, say to thicknesses around 50 μm or less, such reduction of thickness being desirable in itself in order to speed up cooling and thereby reduce response times.

In accordance with the present invention, such fatigue is reduced by the application of additional material over the SMA wire in contact with the member and the SMA wire to reduce mechanical stresses in the SMA wire. It is hypothesized that the fatigue is reduced as follows. The fatigue is associated with buckling of the SMA wire where it emerges from the connection with the member, the buckling being associated with the dynamic forces on the SMA wire at this location, perhaps initiated by tiny surface nicking of the SMA wire. These effects are reduced by the support provided by the additional material at this location.

All the aspects of the invention have particular application to a miniature camera lens element which includes one or more lenses having a diameter of at most 10 mm.

The various aspects of the invention and the features thereof may be used together in any combination.

BRIEF DESCRIPTION OF THE DRAWINGS

To allow better understanding, an embodiment of the present invention will now be described by way of non-limitative example with reference to the accompanying drawings, in which.

DETAILED DESCRIPTION OF THE INVENTION

There will first be described the structure of a camera 1 incorporating an SMA actuation apparatus.

Figure 1:
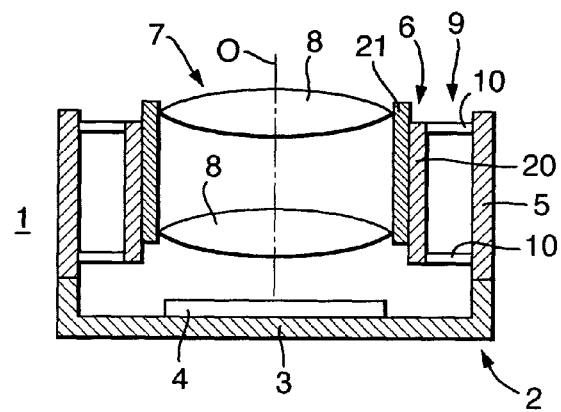
FIG. 1 is a schematic cross-sectional view of a camera incorporating an SMA actuation arrangement.

The camera 1 is shown schematically in FIG. 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10 mm. The lens element 6 is arranged with the optical axis O of the lens system 7 perpendicular to the image sensor 4. In this manner, the lens system 7 focuses light onto the image sensor 4.

The lens element 6 is suspended on the support structure 2 by a suspension system 9 consisting of two suspension elements 10 connected between the annular wall 5 of the support structure 2 and the lens element 6. The suspension system 9 guides movement of the lens element 6 along the optical axis O. Such movement of the lens element 6 changes the focus of the image formed on the image sensor 4.

Figure 2:
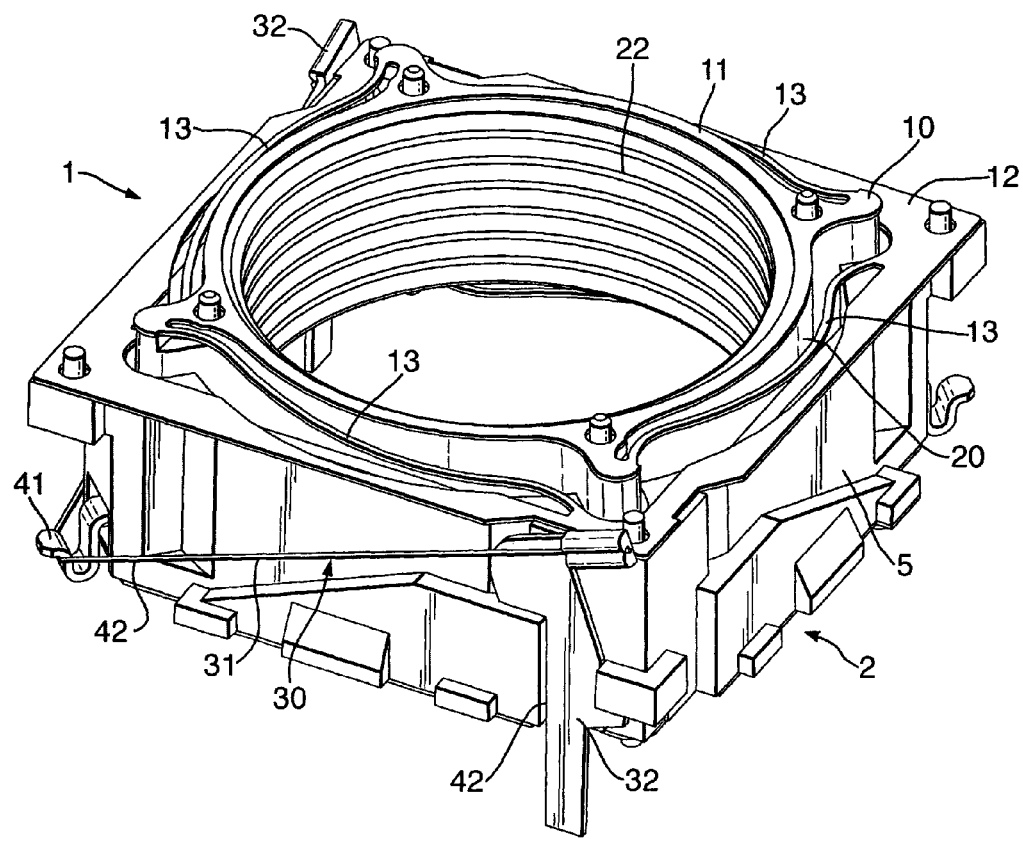
FIG. 2 is a detailed perspective view of the camera.

The detailed construction of the camera 1 will now be described with reference to FIG. 2 which is a detailed perspective view omitting the base 3 of the support structure 2.

The lens element 6 has a two-part construction comprising a lens carrier 20 and a lens holder 21 mounted inside the lens carrier 20 on an internal screw thread 22 formed inside the lens carrier 20. Typically the lens holder 21 has a diameter of 6.5 mm. Fixed to the lower rim of the lens carrier 20 is a metal ring 14 described further below. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The suspension system 9 for the lens element 6 will now be described in detail. The suspension system 9 comprises two suspension elements 10 each formed from a respective single sheet of material such as steel or beryllium copper cut into shape. One possibility is hard rolled grade 302 austenetic steel which has the advantage of providing a high yield stress. The suspension elements 10 are mounted at opposite ends of the carrier 20. Whilst only one of the suspension elements 10 is clearly visible in FIG. 2, both suspension elements 10 have an identical construction, as follows.

Each suspension element 10 comprises an inner ring 11 connected to the lens carrier 20. In particular, the inner ring 11 is connected to a respective end surface of the lens carrier 20 so that it extends around the outer circumference of the lens holder 21. Each suspension element 10 further comprises an outer ring 12 connected to the support structure 2. In particular, the outer ring 12 extends around and is connected to the end surface of the annular wall 5 of the support structure 2.

Lastly, each suspension element 10 comprises four flexures 13 which each extend between the inner ring 11 and the outer ring 12. Thus the flexures 13 are coupled at opposite ends to the lens element 6 and the support structure 2. As viewed along the optical axis O, the flexures 13 are inclined relative to the direction radial of the optical axis O. Thus the flexures 13 extend around the optical axis. The flexures 13 are disposed around the lens carrier 20 at different radial positions with rotational symmetry around the optical axis O. Furthermore, the flexures 13 have a thickness along the optical axis O (that is the thickness of the sheet of material from which the suspension element 10 is made) which is smaller than their width in a direction perpendicular to the optical axis O. The suspension system 9 is designed with an appropriate number of flexures 13 of appropriate width, thickness and length to provide the desired degree of stiffness along the optical axis O and perpendicular thereto. The flexures 13 typically have a thickness in the range from 25 μm to 100 μm. The number of flexures 13 may be changed by varying the number of flexures 13 within a suspension element 10 and/or by providing additional suspension elements 10.

The flexures 13 are also curved along their length as viewed along the optical axis O with three regions of alternating curvature. By introducing such curvature to the flexures 13, a degree of strain relief is added to the structure. The tendency of the flexures 13 to plastically deform is reduced and instead the flexures 13 have a tendency to bend elastically. By introducing the outer regions having opposite curvature to the central region, the force imbalance is reduced and the stress developed at the joints with the inner ring 11 and outer ring 12 are reduced. Thus the flexures 13 become more compliant in the planar direction without experiencing material failure. This is achieved without an unacceptable compromise to the radial and axial stiffnesses. This allows the suspension system 9 to accommodate the displacement of the lens element 6 radially of the optical axis O caused by mechanical impacts without causing permanent damage to the flexures 13. To limit the displacement in this direction, the camera 1 is provided with a small clearance, for example of the order of 50 μm or less, between the lens element 6 and the wall 5 of the support structure 2 so that the wall 5 of the support structure 2 acts as a stop to limit the maximum displacement.

To maximize this effect the three regions of the flexures 13 preferably have unequal lengths and curvature, in particular with the central region having a greater length and a lesser curvature than the outer regions. Advantageously, the central region has a length which is at least twice the length of the outer regions, for example with the ratio of the lengths of the three regions 1:2.5:1. Advantageously, the central region has a curvature which is at most half the curvature of the outer regions, for example with the ratio of length to curvature of each region being substantially the same so that the angles subtended by each region are substantially the same.

Optionally, each flexure 13 could be modified to consist of a group of parallel flexures to allow the suspension system 9 to be made more compliant radially of the optical axis by reducing the width of each parallel flexure. The practical limitation to this technique is the minimum width to which the parallel flexures may be manufactured.

The two suspension elements 10 suspend the lens element 6 on the support structure 2 by means of the flexures 13 being coupled between the lens element 6 and the support structure 2. Due to their configuration, the flexures 13 accommodate movement of the lens element 6 along the optical axis O by flexing or bending. When the lens element 6 moves along the optical axis O, the inner rings 11 move along the optical axis O relative to the outer rings 12 with consequent bending of the flexures 13.

As the flexures 13 have a thickness parallel to the optical axis O which is smaller than their width, the flexures 13 are more compliant to bending in their thickness direction than to bending in their width direction. Accordingly, the flexures 13 provide the suspension system 9 with a lower degree of stiffness against movement of the lens element 6 relative to the support structure 2 along the optical axis O, than against movement of the lens element 6 relative to the support structure 2 perpendicular to the optical axis O.

Furthermore, the two suspension elements 10 are spaced apart along the optical axis O and thus the resistance to movement of the lens element 6 perpendicular to the optical axis O also provides resistance to tilting of the lens element 6.

Such resistance to off-axis movement and tilting of the lens element 6 is desirable because such off-axis movement and tilting can degrade the optical performance of the lens system 7 in focussing an image on the image sensor 4.

Figure 3:
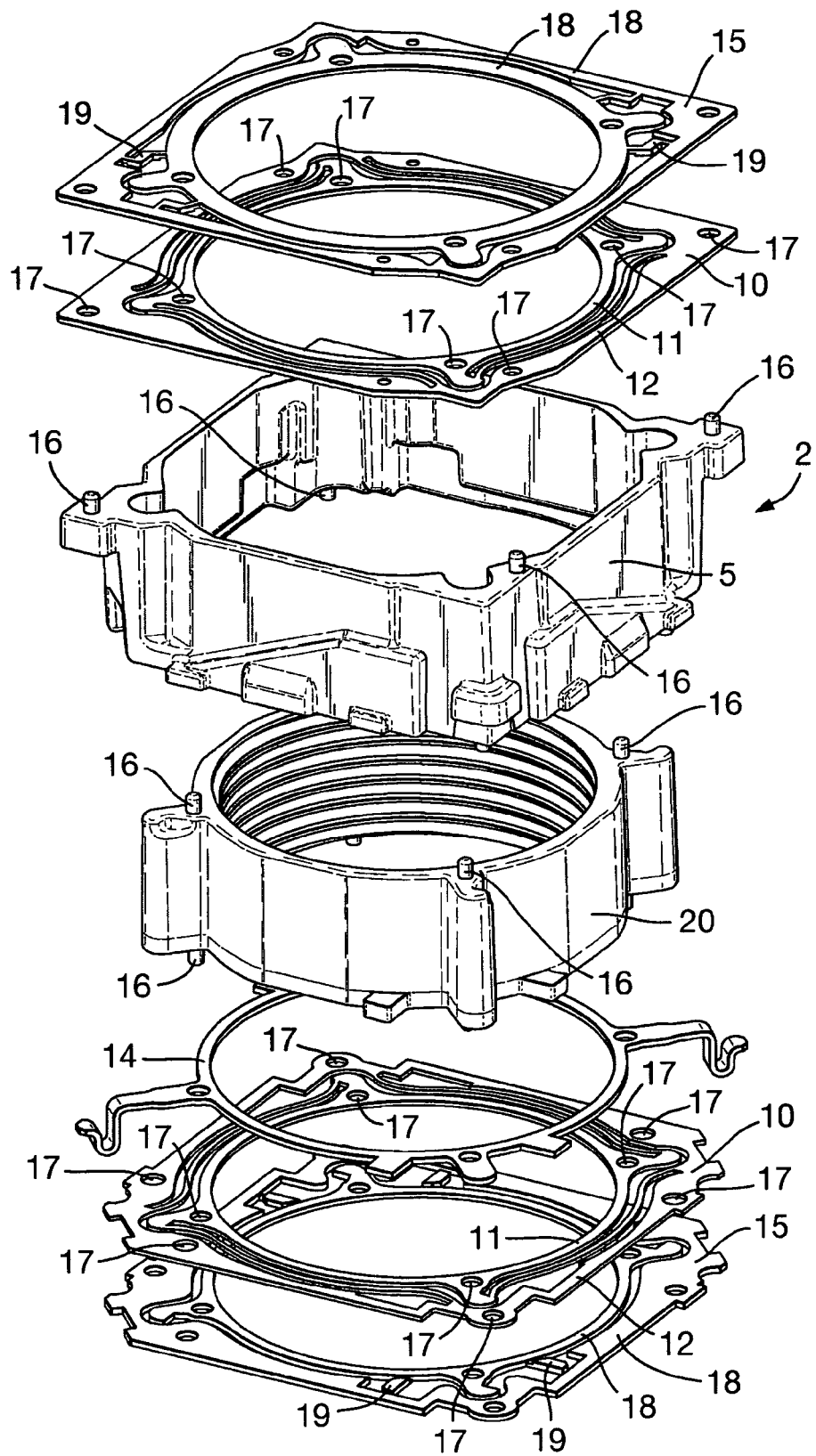
FIG. 3 is an exploded perspective view of part of the camera.

The support structure 2, lens carrier 20 (including the metal ring 14), the suspension elements 10 and two stiffener elements 15 are manufactured as a subassembly as will now be described with reference to FIG. 3. These components are arranged in a stack as shown in FIG. 3. Location pins 16 formed on the support structure 2 and the lens carrier 20 locate in apertures 17 formed in the suspension elements 10. While the complete stack is compressed in a jig, adhesive is dispensed onto the ends of each of the location pins 16, both on the top and bottom of the stack. The preferred adhesive is a cyanoacrylate that is also UV curable. By capillary action the adhesive soaks around the location pins 16, and bonds the different layers to the support structure 2 and the lens carrier 20. Once the adhesive has cured, the subassembly can be removed from the jig. As an alternative to adhesive, it is possible to form the joints be heat staking the location pins 16 to form a plastic head that retains the parts mechanically.

Each stiffener 15 comprises two rings 18 which respectively conform to, and stiffen, the inner ring 11 and the outer ring 12 of a suspension element. The two rings 18 are joined together by sprues 19 which are removed only after the subassembly has been assembled. The use of the sprues 19 helps assembly in terms of jigging the rings 18 of the stiffeners 15, and reduces the component count, and hence part cost. Once the sprues 19 are removed, the lens carrier 20 can be moved upwardly relative to the support structure 2 by an external load.

Figure 4:
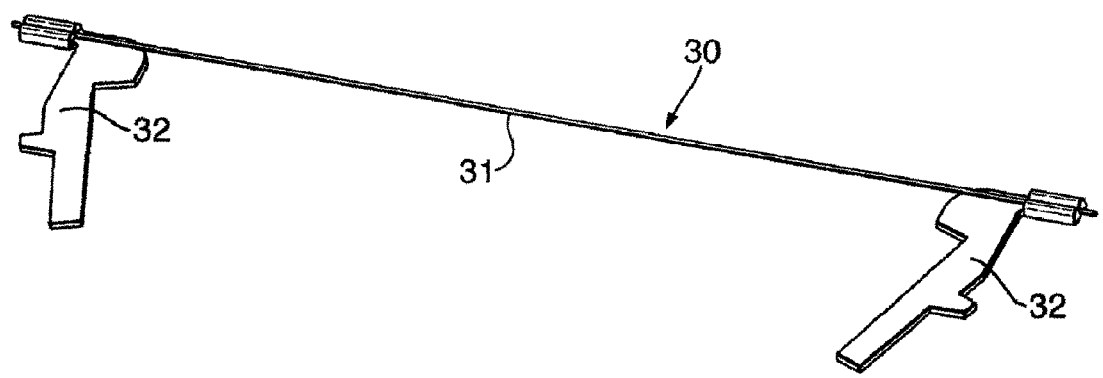
FIG. 4 is a perspective view of an SMA actuator of the camera.

In addition, the camera 1 comprises an SMA actuator 30 which is illustrated in isolation in FIG. 4. The SMA actuator 30 comprises a piece of SMA wire 31 connected at each end to a respective mounting member 32, each formed as an elongate piece of metal for example brass. In particular the mounting members 32 are each crimped over the ends of the piece of SMA wire 31.

During manufacture, the SMA actuator 30 is made as a subassembly separately from the remainder of the camera 1. In particular, the SMA actuator 30 is manufactured by holding the mounting members 32 in place, applying the piece of SMA wire 31 taut over the mounting members 32 and then crimping the mounting members 32 over the ends of the piece of SMA wire 31. The SMA actuator 30 is then assembled into the camera 1 in the arrangement as follows.

The two mounting members 32 are each mounted onto the outside of the annular wall 5 of the support structure 2 and are fixed in place so that to connect the piece of SMA wire 31 to the support structure 2. As shown in FIG. 2, the mounting members 32 and 33 are mounted in recesses 40 provided in the annular wall 5, for example by adhesive, swaging of the wall 5 or some other means.

Furthermore, the piece of SMA wire 31 is connected to the lens element 6 by being hooked over a retaining element 41 which is an integral part of the metal ring 14 fixed to the lens element 6 and protrudes outwardly of the lens element 6. The surface of the retaining element 41 in contact with the piece of SMA wire 31 may be curved to reduce the maximum curvature of the SMA wire 31.

In the camera 1, the mounting members 32 and 33 are positioned on diametrically opposite points around the optical axis O. The retaining element 41 is positioned mid-way between the two mounting members 32 around the optical axis O. As viewed along the optical axis, the lengths 42 of SMA wire 31 extend at 90° to each other along sides of the camera 1. After the assembly and in equilibrium, the piece of SMA wire 31 can be held in place with a small amount of adhesive, to ensure retention on the retaining elements 41 during operation or drop testing. This may be done after cycling of the SMA wire 31 to help eliminate assembly tolerances.

The retaining element 41 is arranged at a position along the optical axis O which is closer to the image sensor 4 than the portion of the mounting members 32 to which the piece of SMA wire 31 is crimped. As a result, the two lengths 42 of SMA wire 31 formed by half of the piece of SMA wire 31 on either side of the retaining element 41 are held at an acute angle to the optical axis O. Slippage over the retaining element 41 during assembly assists in achieving equal lengths and tensions for the two lengths 42 of SMA wire 31.

The lengths 42 of SMA wire 31 are held in tension in the camera 1 so that they apply a tensional force having a component along the optical axis O, in particular in a direction biassing the lens element 6 away from the image sensor 4. This is used to drive movement of the lens element 6 along the optical axis O as described below.

In addition, each individual length 42 of SMA wire 31 applies a tensional force having a component perpendicular to the optical axis O. Some of the components of these forces are balanced by the symmetrical arrangement of the two lengths 42 of wire but there remains a net component of force radially of the optical axis O at the retaining element 41, this tending to tilt the lens element 6. However, the tilt is resisted by the suspension system 9 to be sufficiently small to be adequate for many lenses and image sensors.

The operation of the camera 1 to drive movement of the lens element 6 along the optical axis O relative to the support structure 2 will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the lengths 42 of SMA wire 31 causes them to decrease in length.

In the camera 1, the lengths 42 of SMA wire 31 are arranged in tension providing a net tensional force along the optical axis O between the lens element 6 and the support structure 2 in a direction moving the lens element 6 away from the image sensor 4. This force acts against the biassing force provided by the suspension system 9 in the opposite direction along the optical axis O. The flexures 13 flex depending on the tensional force from the lengths 42 of SMA wire 31. The flexures 13 as manufactured are straight as viewed radially of the optical axis O. On flexing the flexures 13 remain generally straight although some slight curvature may be generated. Thus the flexing of the flexures 13 provides biassing of the camera lens element 6 in an opposite direction from the tensional force applied by the lengths 42 of SMA wire 31. In other words the suspension system 9 provides the function of acting as a passive biassing arrangement for the lengths 42 of SMA wire 31 as well as the function of suspending and guiding movement of the camera lens element 6.

In the unheated state of the SMA wire 31 in which it is not contracted, the SMA wire 31 is in tension, thereby displacing the lens element 6 away from its rest position in the absence of the SMA wire 31. In this state, the lens element 6 is in its closest position to the image sensor 4 within its range of movement. The camera 1 is designed so that this position corresponds to far-field or hyperfocal focus, which is the most common setting for the camera 1, particularly if an auto-focus function is provided.

On heating of the lengths 42 of SMA wire 31 so that the stress therein increases, the lengths 42 of SMA wire 31 contract moving the lens element 6 away from the image sensor 4. The lens element 6 moves over a range of movement as the temperature of the SMA wire 31 increases over the range of temperature in which the transition of the material of the SMA wire from the Martensite phase to the Austenite phase occurs. Over this range of movement, the lens element 6 focusses an image on the image sensor 4 from successively closer distances. The camera 1 is designed so that the position of the lens element 6 at the end of the range of movement corresponds to a close-field focus, often referred to as a macro focus.

Conversely, on subsequent cooling of the lengths 42 of SMA wire 31 so that the stress therein decreases, the biassing provided by the flexures 13 causes the lengths 42 of SMA wire 31 to expand moving the lens element 6 towards the image sensor 4.

To maximise the movement of the lens element 6 relative to the support structure 2 along the optical axis O, the total stiffness of the flexures 13 of the suspension system 9 is preferably in the range from (a) the total stiffness of the lengths 42 of SMA wire 31 experienced in the austenite phase of the SMA material to (b) the total stiffness of the lengths 42 of SMA wire 31 experienced in the martensite phase of the SMA material, more preferably the geometric mean of values (a) and (b).

It is desired that the total stiffness against movement of the lens element 6 relative to the support structure 2 along the optical axis O, provided by the sum of the stiffnesses of the flexures 13 and the lengths 42 of SMA wire 31, is sufficiently great to minimize the movement of the lens element 6 relative to the support structure 2 under gravity when the camera 1 changes between orientations. For typical lens systems the movement is desirably limited to at most 50 μm which for a typical miniature camera this means that the overall stiffness should be at least 100 N/m, preferably at least 120 N/m.

The flexures 13 are designed with an appropriate width to provide the desired stiffness against movement of the lens element 6 relative to the support structure 2 in directions perpendicular to the optical axis O, based on the extent to which the lens element 7 can accommodate off-axis motion and tilting. The stiffness of the lengths 42 of SMA wire 31 is also taken into account but usually provides a smaller contribution.

Another design consideration is to ensure that the maximum stress experienced by the flexures 13 and the lengths 42 of SMA wire 31 do not over-stress the respective materials.

The degree of displacement of the lens element 6 relative to the support structure 2 along the optical axis O is dependent on the stress developed within the lengths 42 of SMA wire 31 and also on the acute angle of the lengths 42 of SMA wire 31 with respect to the optical axis O. The strain which may be developed in an SMA wire 31 is limited by the physical phenomenon of the phase change. Due to the acute angles of the lengths 42 of SMA wire 31 with respect to the optical axis O, the lengths 42 of the SMA wire 31 change in orientation when they change in length. This effectively gears the movement so that the degree of displacement of the lens element 6 along the optical axis O is higher than the change in length of the lengths 42 of SMA resolved along the optical axis O. In general the acute angle may take any value but is approximately 70° in the example of FIG. 2.

The position of the lens element 6 relative to the support structure 2 along the optical axis O may be controlled by control of the temperature of the lengths 42 of SMA wire 31. In operation, heating of the lengths 42 of SMA wire 31 is provided by passing a current therethrough which provides resistive heating. Cooling is provided by ceasing (or reducing) the current and allowing the lengths 42 of SMA wire 31 to cool by conduction to the surroundings. The current is controlled by a control circuit 50 which is described further below.

The SMA wire 31 may be made of any suitable SMA material, for example Nitinol or another Titanium-alloy SMA material. Advantageously, the material composition and pre-treatment of the SMA wire 31 is chosen so that the phase change occurs over a range of temperature which is (a) above the expected ambient temperature during normal operation, typically above 70° C. and (b) as wide as possible to maximise the degree of positional control.

High speed actuation of the lens element 6 is desired in many applications, for example if an auto-focus function is provided. The speed of response of the actuation is limited by the cooling of the lengths 42 of SMA wire 31. The cooling may be speeded up by reducing the thickness of the lengths 42 of SMA wire 31. For the size of cameras and wires under consideration, the cooling time changes approximately linearly with wire diameter. For this reason, the thickness of the lengths 42 of SMA wire 31 is desirably at most 35 μm to provide a response which is acceptable for an auto-focus application of the camera 1.

Figure 5:
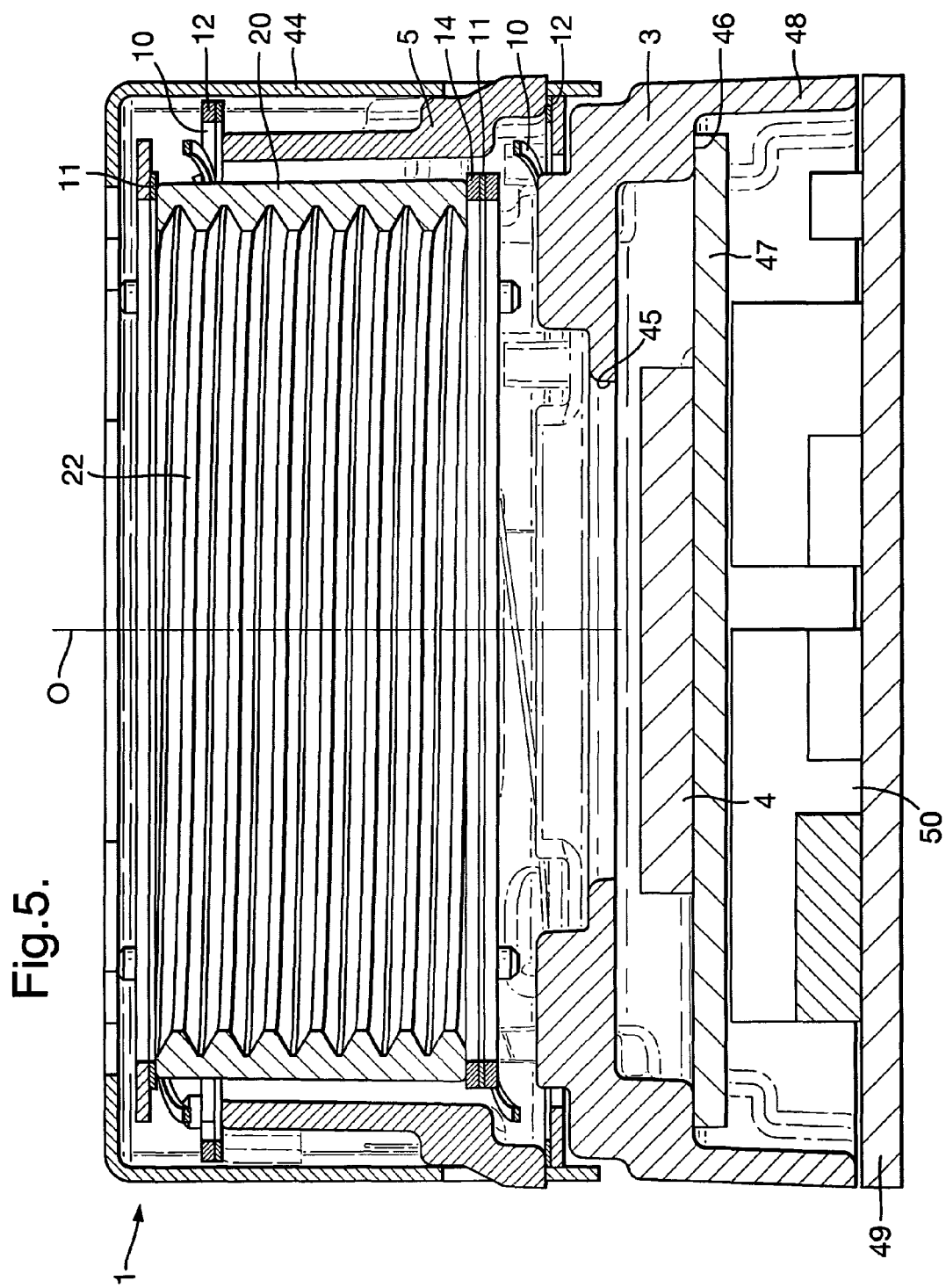
FIG. 5 is a detailed cross-sectional view of the camera.

FIG. 5 shows in detail the camera 1 except omitting the lens holder 21 for clarity. The additional components of the camera 1 beyond those shown in FIG. 2 will now be described.

The camera 1 has a screening can 44 clipped and bonded over the wall 5 of the support structure 2. The wall 5 is also bonded to the base 3 of the support structure 2. In the direction along the optical axis O, there are clearances between the lens element 6 and the screening can 44 and between the lens element 6 and the base 3 which allow sufficient movement of the lens element 6 along the optical axis O to provide for focussing of the image on the image sensor 4 whilst preventing a degree of movement which would damage the suspension system 9 or the lengths 42 of SMA wire 31. Thus the screening can 44 and the base 3 effectively form end-stops for the movement of the lens element 6 along the optical axis.

In fact the base 3 has a more complicated construction than is shown schematically in FIG. 1. In particular the base 3 has a central aperture 45 behind which the image sensor 4 is mounted. For mounting of the image sensor 4, the base 3 has a ledge 45 formed to the rear of the aperture 45 and outside the area of the aperture 45. On the ledge 46 is mounted an image circuit board 47 on which the image sensor 4 is formed facing and aligned with the aperture 45 to receive light along the optical axis O. Optionally the aperture 45 may have an infra-red filter fitted thereacross to improve the image quality, but also as a seal to prevent dust landing on the image sensor 4.

The base 3 further includes a protruding wall 48 disposed outside the ledge 46 and protruding rearwardly. A drive circuit board 49 is mounted on the protruding wall 48 and the drive circuit 50 is formed on that drive circuit board. As an alternative, it is possible to use an image circuit board 47 which is double-sided, with the drive circuit 50 mounted on its underside. Another alternative is to integrate the control circuit 50 into the same chip as the image sensor 4. Alternatively the same processing function could be carried out by another processor in the electronic device outside the camera 1, but already present for other purposes.

A camera of identical construction to the camera 1 is described in co-owned International Patent Application No. PCT/GB07/001,050 containing additional disclosure about the construction and manufacture which may be applied to the camera 1. Accordingly, International Patent Application No. PCT/GB07/001,050 is incorporated herein by reference. Numerous variations to the design and manufacture of the SMA actuator 30 and the actuation arrangement in the camera 1 are possible, for example as described in International Patent Application No. PCT/GB07/001,050.

The nature of the control circuit 50 and the control effected thereby will now be described.

Figure 6:
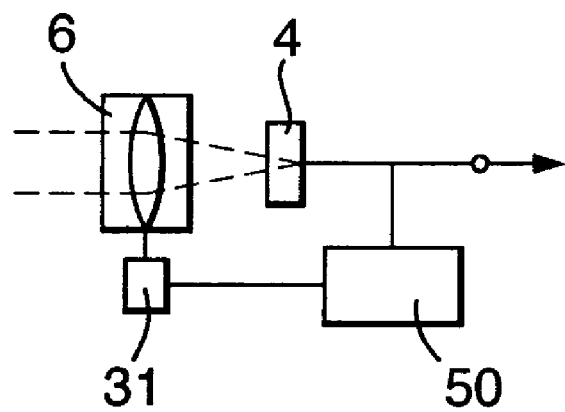
FIG. 6 is a schematic diagram of the overall control arrangement of the camera.

A schematic view of the overall control arrangement is shown in FIG. 6. The control circuit 50 is connected to the piece of SMA wire 31 and applies a current thereto to control the temperature of the SMA wire 31 which moves the lens element 6 and changes the focus of the image formed on the image sensor 4. The output of the image sensor 4 is supplied to the control circuit 50 to be processed for determination of a measure of the quality of focus.

Figure 7:
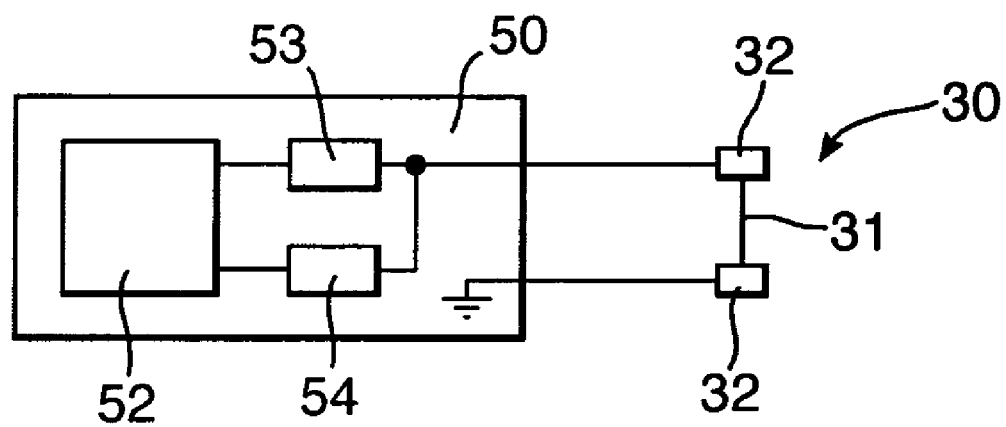
FIG. 7 is a diagram of the control circuit.

The control circuit 50 is shown in FIG. 7. The control circuit 50 is connected to each of the mounting members 32 which provide electrical connection to the piece by means of the crimping thereof.

The control circuit 50 supplies a current between the two mounting members 32. The control circuit 50 controls the degree of heating of the SMA wire 31 by varying the power of the current flowing therethrough. The control circuit 50 varies the power of the current in response to the resistance of the piece of SMA wire 31 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50.

The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 8:
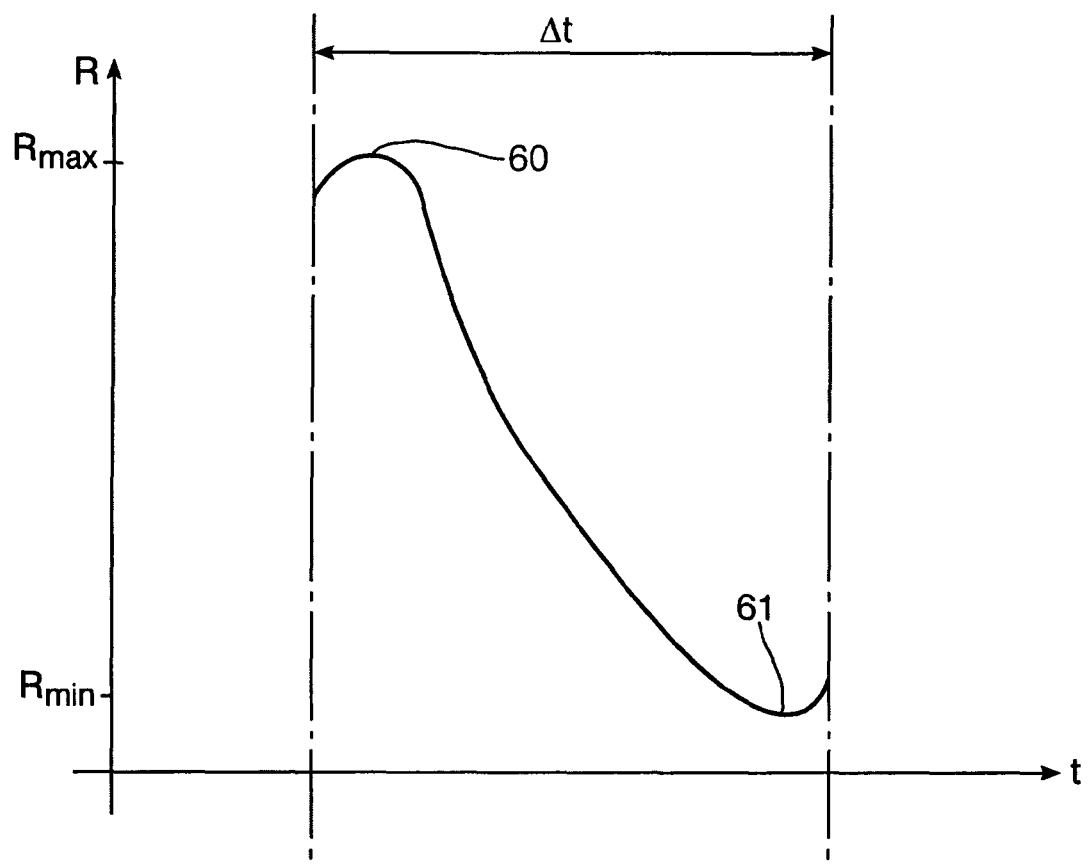
FIG. 8 is a graph of the resistance-length property of SMA during contraction.

Thus, SMA has a property that resistance varies with length during heating and contraction along a curve of the form shown in FIG. 8 which is a graph of resistance of the SMA against length of the SMA, corresponding to the position x of the lens element 6, the length increasing as the SMA contracts corresponding to increasing temperature. Thus across the phase transition range, the lens element 6 moves across a positional range Δx due to the contraction of the SMA. The resistance rises across a small initial part of the positional range Δx to a local maximum 60 having a resistance value Rmax. The resistance falls across the major part of the positional range Δx to a local minimum 61 having a resistance value Rmin, whereafter the resistance rises across a small final part of the positional range Δx.

Due to this property of SMA material, the control circuit 50 implements control based on the measured resistance as follows. From an unheated state, the control circuit 50 heats the SMA wire 31 until the local maximum resistance value is detected. This is used as an indication that contraction has started to occur. In fact a small amount of contraction has already occurred. However the local resistance maximum 60 can be easily detected, whereas the start of the positional range Δx cannot. Accordingly, the local resistance maximum 60 is used and this is so close to the start of the positional range Δx that the loss of movement is not significant.

Thereafter the control circuit 50 heats the SMA wire 31 using the measured resistance as a measure of position. The local minimum resistance 61 is used to indicate the end of the positional range Δx. In fact, a small amount of contraction is still available. However the local minimum resistance 61 can be easily detected, whereas the end of the positional range Δx cannot. Accordingly, the local minimum resistance 61 may be used. This is so close to the end of the of the positional range Δx that the loss of movement is not significant.

The control circuit 50 uses pulse-width modulation (PWM). In particular, the control circuit 50 applies a pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the piece of SMA wire 31 is low and so the wire cools even though some current is being supplied. Conversely, when the duty cycle is at a high value in the range, the SMA wire 31 heats. The resistance is measured during the current pulse, for example after a short, predetermined delay from the start of the pulse.

During heating of the SMA wire 31 from a cool state below the phase transition range, the resistance varies with position in the manner shown in FIG. 8 in a manner which is consistent from sample to sample and in successive heating cycles. However, during cooling the resistance changes along a curve of similar form but the variation of resistance is less repeatable from sample to sample and there is variable hysteresis as compared to the heating. This does not prevent the use of resistance as a measure of position during cooling altogether, but does reduce the accuracy of the control. This problem is avoided by the control circuit 50 following a predetermined and repeated motion in which positional control is only effected during heating of the sample as described below.

The control circuit 50 includes the following components as shown in FIG. 7.

The control circuit 50 includes a current source 53 which is connected to supply current to the piece of SMA wire 31. The current source 53 may be a constant-voltage current source or a constant-current current source. For example, in the latter case the constant current might be of the order of 120 mA.

The control circuit 50 further includes a detection circuit 54 arranged to detect the resistance of the piece of SMA wire 31.

In the case that the current source 53 is a constant-current current source, the detection circuit 54 may be a voltage detection circuit operable to detect the voltage across the piece of SMA wire 31 which is a measure of the resistance of the piece of SMA wire 31.

In the case that the current source 53 is a constant-voltage current source, the detection circuit 54 may be a current detection circuit, but is preferably a Wheatstone bridge arrangement operable to measure the resistance directly.

A controller 52 implemented by a suitable microprocessor controls the current source 53 to supply a pulse-width modulated current. The controller 52 receives the resistance measured by the detection circuit 54 and performs the PWM control in response thereto.

Figure 9:
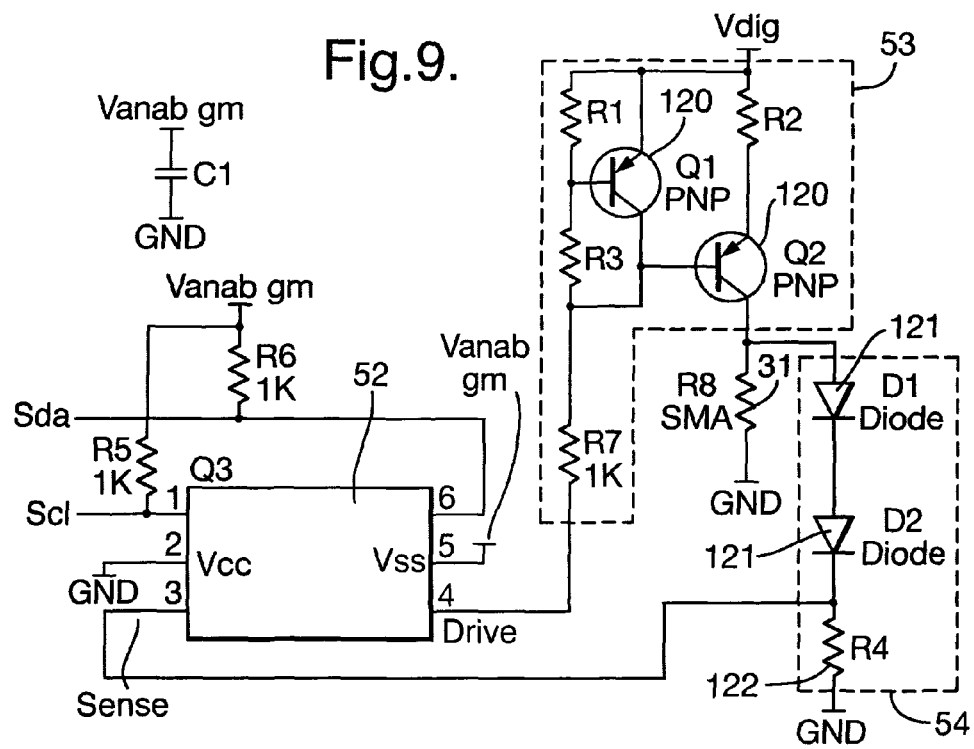
FIGS. 9 and 10 are diagrams of two possible circuit implementations for the control circuit.
Figure 10:
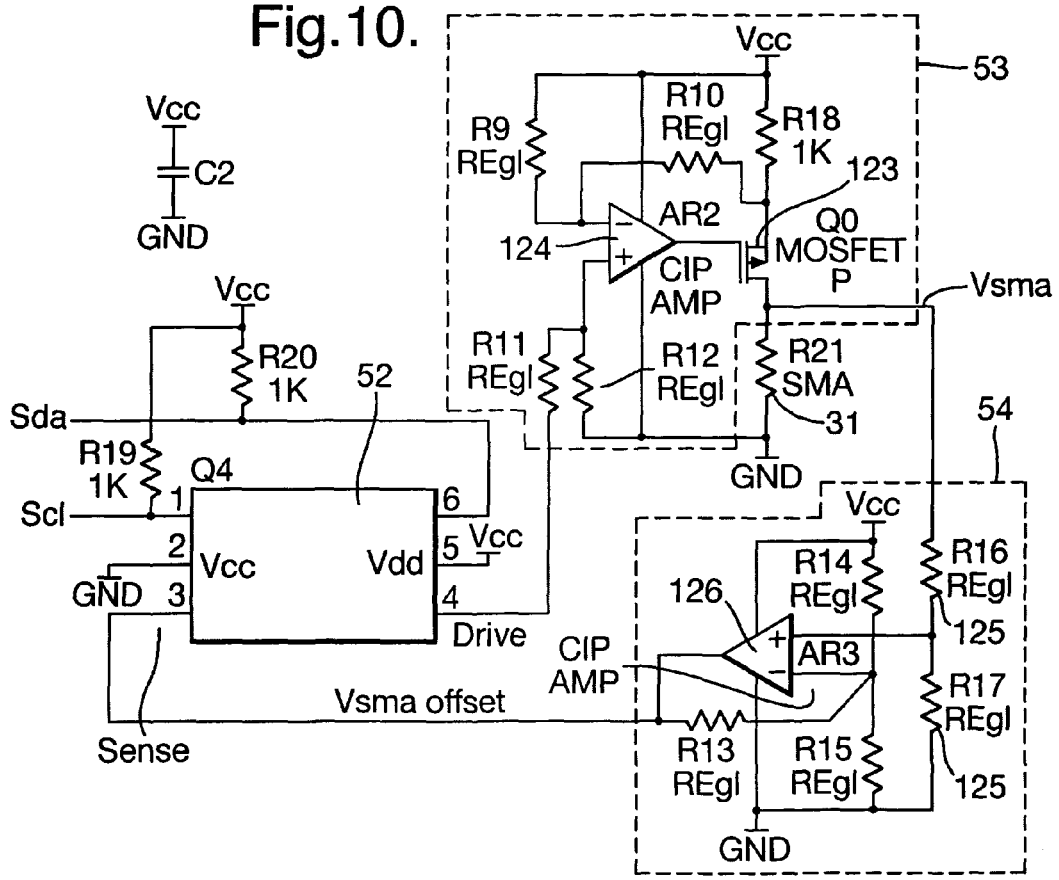

Two detailed circuit implementations for the control circuit 50 are shown in FIGS. 9 and 10.

The first circuit implementation of FIG. 9 is cheap but has limited performance. In particular, the current source 53 is a constant-current current source implemented using a simple arrangement of bipolar transistors 120. The voltage detector circuit 54 is formed as a simple bridge arrangement of a pair of diodes 121 and a resistor 122.

The second circuit implementation of FIG. 10 is more accurate but is more expensive. In particular, the current source 53 is a constant-current current source implemented by a MOSFET transistor 123 controlled by an operational amplifier 124. The detection circuit 125 is implemented by a bridge arrangement of two resistors 125, the output of which is amplified by an operational amplifier 126. The operational amplifier 126 allows the A/D convertor of the controller 52 to make use of its full dynamic range.

The control circuit 50 monitors the resistance of the piece of SMA wire 31 detected by the detector circuit 54 and varies the power of the current using the measured resistance of the SMA actuator as a feedback signal to drive the measured resistance to a target value. In particular, the duty cycle of the pulse-width modulated current is varied. The controller 52 may implement a number of control algorithms to vary the duty cycle. One possibility is proportional control in which the duty cycle is varied by an amount proportional to the difference between the detected resistance and the target resistance. As the SMA wire 31 heats across the active temperature region, the decrease in resistance is sensed and used in a feedback control technique. The stability of the feedback control is maintained by the inherent proportional-integral action of the SMA wire 31 itself during heating. The overall feedback response is dominated by the response of the whole of the heating of the SMA wire 31. Such a proportional control feedback loop provides for accurate control of position.

The SMA wire 31 may have some non-linearities in its response. Such non-linearities may be limited by incorporating precompensation in the control circuit 50. One option is for the precompensation to consist of a gain or offset modifier on the output signal supplied to the current source 53, for example based on the demand and the history of the demand signal. This is most beneficial if insufficient feedback is present to control the SMA wire 31.

The control circuit 50 implements an autofocus algorithm. In this case, the control may be based on a measure of the quality of focus of the image, for example a modulation transfer function or a spatial frequency response, derived by the controller 52 from the image signal from the image sensor 4. A wide range of suitable measures are known and any such measure may be applied. However, there is a limitation that the derivation of the measure of the quality of focus is slow. To combat this, during a scan across many focus positions, at the desired focus position at which the measure of the quality of focus is at an acceptable level, desirably the best focus, the control circuit 50 may determine and store the resistance value. Then at the end of the scan the lens element 6 is driven back to the same position of the basis of that stored resistance value rather than the focus measure.

Figure 11:
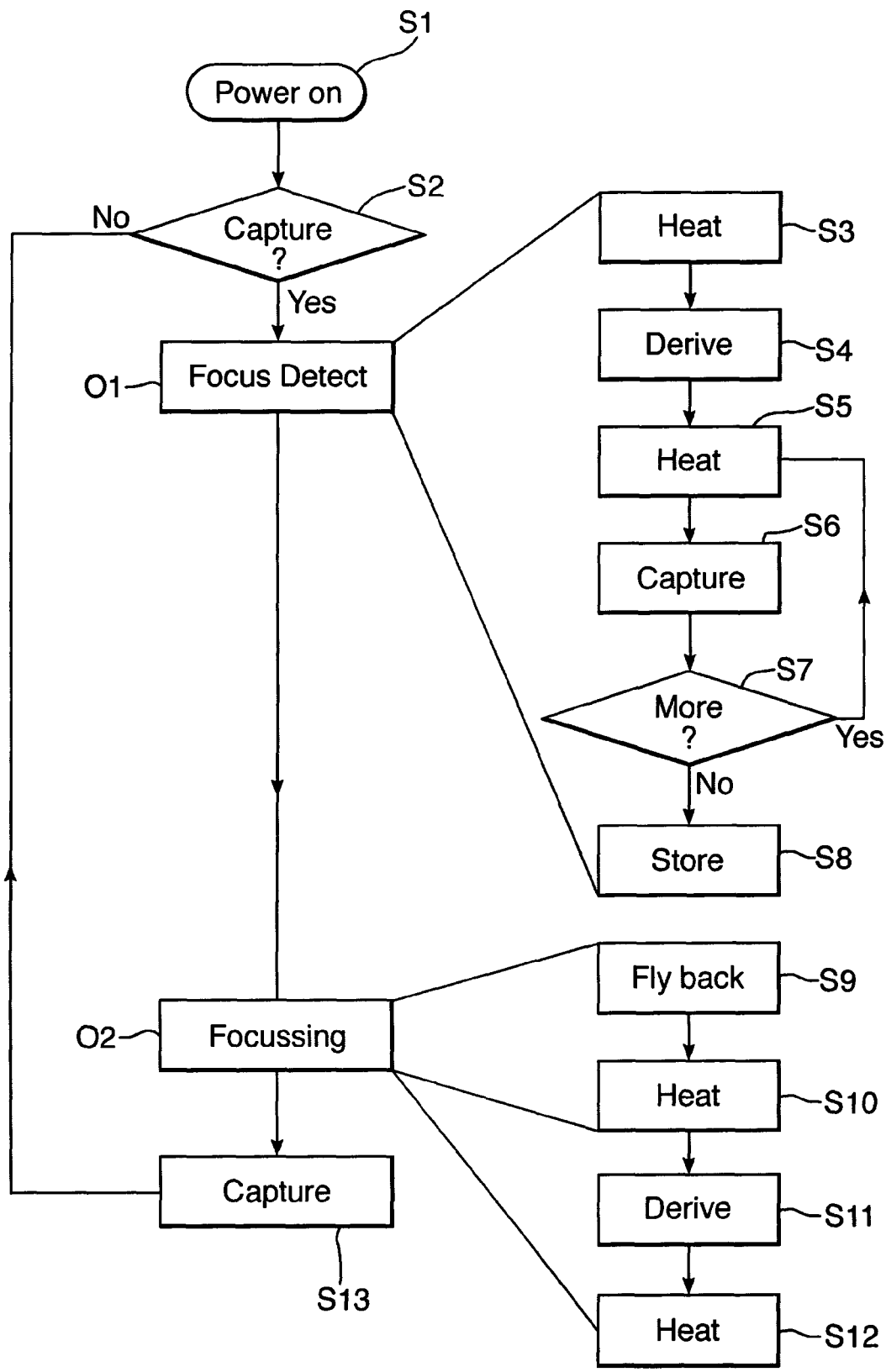
FIG. 11 is a flow chart of control algorithm implemented in the control circuit.

An example of a control algorithm which may be performed by the controller 52 is shown in FIG. 11 and will now be described. By way of illustration, reference is also made to FIG. 12 which illustrates an example of the change in resistance of the lens element 6 with time.

In step S1, power is supplied to the camera 1 and the control circuit 50. The unheated SMA wire 31 is in the Martensite phase and is therefore not contracted.

In step S2, a command to capture an image is awaited. After receiving the command, there is performed a focus scan operation O1, followed by a focus seek operation O2.

The focus scan operation O1 comprises the following steps.

In step S3, the control circuit 50 performs a first heating step of heating the SMA wire 31 from its unheated state. Initially the heating is achieved by the control circuit 50 supplying pulse-width modulated current with the maximum duty cycle. Thus the resistance rises as shown by the curve 71. As the heating continues, a local maximum resistance 72 is encountered, corresponding to the local resistance maximum 60 in FIG. 8. During the heating in step S3, the controller 52 monitors the resistance of the piece of SMA wire 31 detected by the detector circuit 54 to detect the local maximum resistance 72. The first resistance value Rmax1 of the local maximum resistance 72 is stored.

Figure 12:
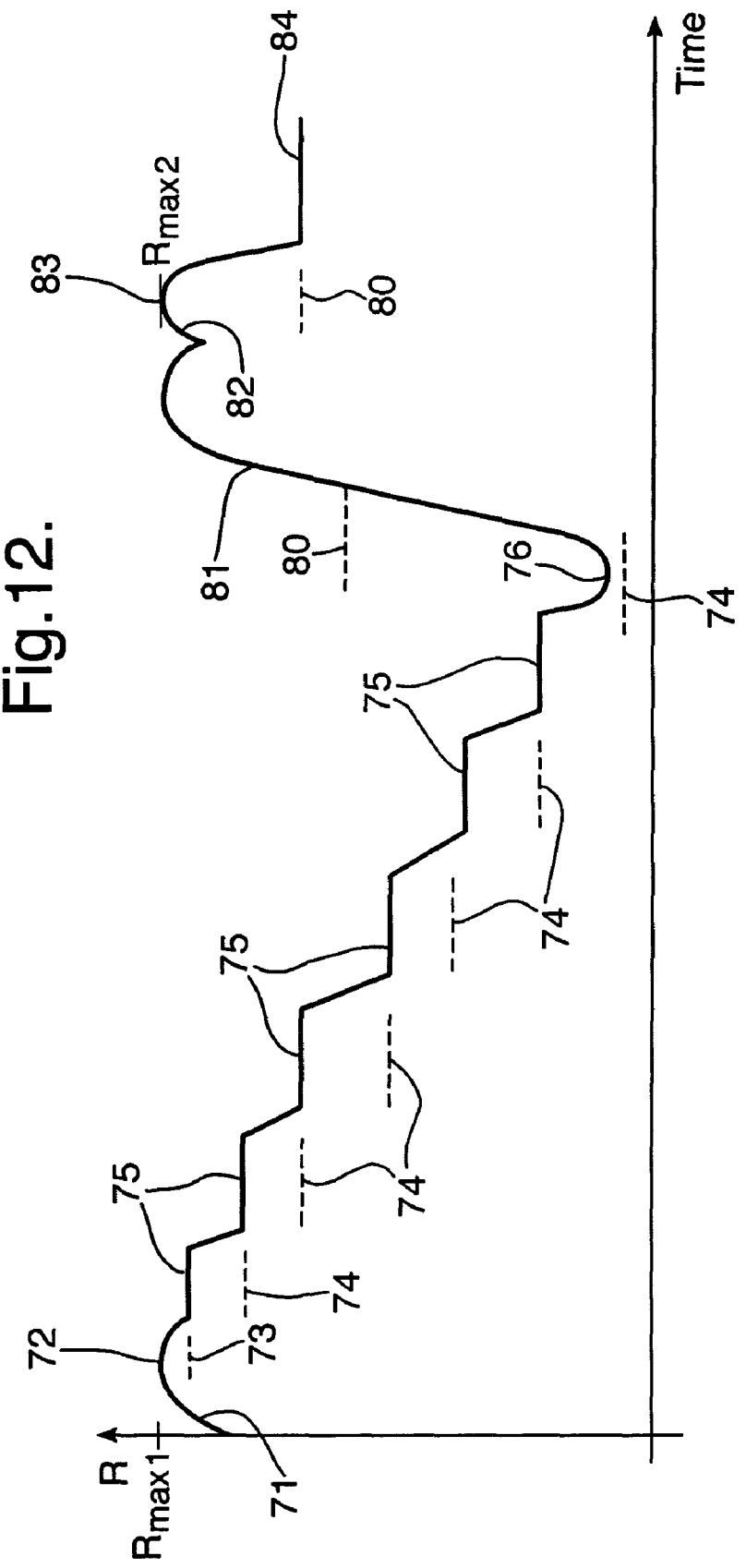
FIG. 12 is a graph of the resistance of the SMA over time with the control algorithm of FIG. 11.

On detection of the local maximum resistance 72, in step S4 there are derived a series of target values 73, 74. Firstly an upper target value 73 is derived from the resistance value of the detected local maximum resistance 72. The upper target value 73 may be the resistance value of the local maximum resistance 72 detected in step S3, but is more preferably that resistance value less a predetermined decrement where the greater slope of the curve shown in FIG. 8 allows for more accurate positional control. Then a predetermined number of further target values 74 at predetermined decrements below the upper target resistance value are derived. In FIG. 12, a limited number of further target values 74 are shown for ease of illustration, but in general there may be any number of target values 73, 74. Indeed a particular advantage of the camera 1 is that it is possible to achieve accurate positional control to a large number of positions.

The target values 73, 74 may be disposed linearly across the range, but there could alternatively be an unequal spread for example concentrated in a particular part of the range.

In steps S5 to S7, there is performed a scan step of scanning across the series of target values. This is achieved by setting in step S5 successive ones of the series of target values to the feedback control loop so that the SMA wire 31 is heated to that one of the target values. Thus in FIG. 12, the resistance is driven to successive plateaus 75 each at the level of one of the target values 73, 74. As the target values 73, 74 successively decrease, the temperature of the SMA wire 31 is raised monotonically.

It is possible that during step S5 a local minimum resistance 76 is encountered, corresponding to the local resistance minimum 61 in FIG. 8, that is if the resistance Rmin of the local resistance minimum 61 is below the current target value 74 of resistance. This is illustrated for example in FIG. 12.

During the heating in step S5, the controller 52 monitors the resistance of the piece of SMA wire 31 detected by the detector circuit 54 to detect the local maximum resistance 76. If this is detected, the method proceeds to step S8.

After the measured resistance has reached a given target value 73, 74 in step S5, then in step S6 an image is captured by the image sensor and a measure of the quality of the focus of the image signal output by the image sensor 4 is derived and stored in the memory of the controller 52 together with the associated target values 73, 74 of resistance.

In step S7, it is determined whether there are any remaining target values 74 in the series. If so, and provided the local resistance minimum has not been detected, the method returns to step S5 so that the process is repeated for each of the target values 73, 74. In this way, as the SMA wire 31 is heated during the scanning, the quality of focus of the image signal is monitored.

Step S8 is reached if the local maximum resistance 76 is detected in step S5 or it is determined in step S7 that there are no remaining target values 74. In step S8, the stored measures of focus quality are used to derive a focus value of the control signal at which the focus quality is at an acceptable level. Most simply this is done by selecting one of the plurality of test values having the best measure of focus quality. As an alternative, it is possible to predict the value of the resistance which would provide the best focus from the test values using a curve-fitting technique. Thus the focus value need not be one of the test values. The curve fit may be a simple mathematic equation such as an Mth order polynomial where M>1 or instead could be chosen as a best-fit to a curve taken from a library of curves premeasured from representative scenes. The focus value is stored in the memory of the controller 52 for subsequent use. FIG. 12 illustrates an example for the stored focus value 80.

Instead of determining the focus value 80 after steps S5 to S7, it could alternatively be determined on-the-fly during steps S5 to S7.

The focus seek operation O2 comprises the following steps.

In step S9, flyback occurs. In particular, the control circuit 50 performs a cooling step of allowing the SMA wire 31 to cool back into the Martensite phase in which it is not contracted. This may be achieved by applying a pulse-width modulated current with a minimum duty cycle, although it could alternatively be achieved by applying no current at all. The transformation into the Martensite phase indicating the end of the flyback phase can be detected by the controller 52 monitoring the voltage measured by the detector circuit 54. Alternatively, the flyback phase can simply be maintained for a pre-determined time selected to be sufficiently long to allow the SMA wire 31 to cool under any expected operating conditions. The flyback is shown by the curve 81 in FIG. 12.

Next, in step S10 the control circuit 50 performs a second heating step of heating the SMA wire 31 from its unheated state. The heating is achieved by the control circuit 50 supplying pulse-width modulated current with the maximum duty cycle. Thus the resistance rises as shown by the curve 82. As the heating continues, a local maximum resistance 83 is encountered, corresponding to the local resistance maximum 60 in FIG. 8. During the heating in step S10, the controller 52 monitors the resistance of the piece of SMA wire 31 detected by the detector circuit 54 to detect the local maximum resistance 83. The second resistance value Rmax2 of the local maximum resistance 83 is stored.

In step S11 a target resistance value 83 is derived based on the stored focus value 80. As the aim is to return the lens element 6 to the same position corresponding to the stored focus value 80 determined in the focus seek operation O1, the target resistance value 83 should be substantially the same value as the stored focus value 80. However, in fact the target resistance value 83 is derived as the stored focus value 80 plus an adjustment to compensate for creep as described further below In step S12, the control circuit 50 performs a seek step of heating the SMA wire 31 to return it to the position corresponding to the target resistance value 83 determined in step S11. This is achieved by the control circuit 52 applying the feedback control technique with the stored focus value 80 being used as a target resistance value 83 so that the measured voltage across the piece of SMA wire 31 used as the feedback signal is driven to that target resistance value 83. The temperature rise is again monotonic, as in the focus scan operation O1. Thus in FIG. 12 during the heating the resistance changes as shown by the curve 82 and then is driven to a plateau 84 at the level of the target resistance value 83.

As discussed above, as a result of the flyback technique achieved by the inclusion of step S9, the target resistance value 83 is approached on the heating cycle and thus the problem of hysteresis in the SMA wire 31 is overcome. Accordingly the lens element 6 is known to be at the position substantially corresponding to the stored focus value 80.

As the image is now properly focussed, in step S13 an image is captured by the image sensor 4. The captured image is stored in a memory.

Figure 13:
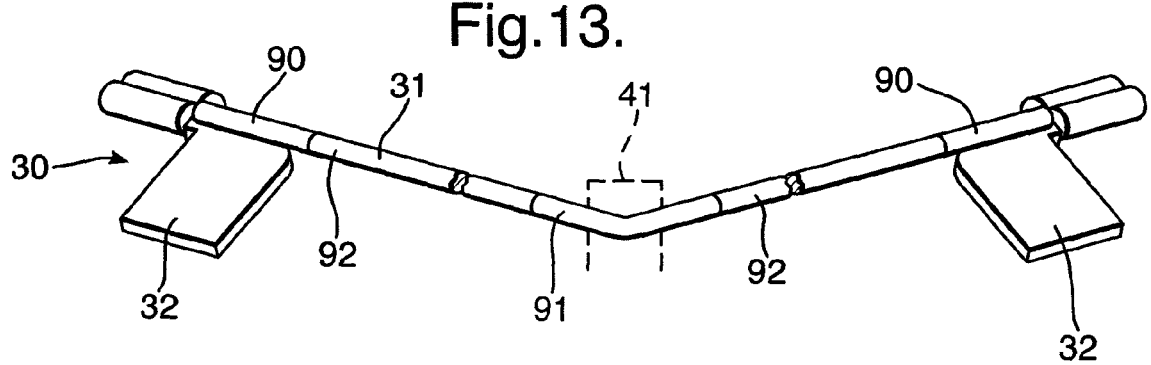
FIG. 13 is a perspective view of the SMA wire having a coating.

Of course the orders of the various steps performed in the methods of FIGS. 11 and 13 are merely an example and may be varied. For example, the focus scan operation O1 may be performed independently of the focus seek operation O2 and the step S13 of capturing an image.

The resistance of the SMA wire 31 provides a good and reliable measure of the position of the lens element 6. However whilst the resistance of the SMA wire 31 is a good measure of position, it has been appreciated that some degree of inaccuracy arises from creep, that is creep over time of the degree of contraction of the SMA actuator at a given resistance, or conversely of the resistance of the SMA actuator at a given degree of resistance.

In any SMA actuator such as the SMA actuator 30 in the camera 1, where SMA resistance feedback is used for precise position control, there are multiple causes of sensed SMA resistance some of which are not related to the overall contraction of the actuator. Thus if a positioning system bases its position reference solely on SMA resistance feedback, and when attempting to hold a steady load position against either varying loads, or ambient temperature changes for example, then in practice, the actual load position can change whilst the SMA resistance remains constant. This is a form of position error. Typically what is seen is that even if ambient temperature conditions and load forces remain constant, the load position will drift slowly off the set position over a time scale characterised by one or more time-constants Tc1, Tc2, etc. This phenomenon is called creep herein. Creep is typically caused by slow thermal changes in the actuator system as a whole, where the time-constants Tci, i=1, 2 . . . just referred to, typically have values greater or much greater than the intrinsic thermal time-constant of the SMA element itself, Tcs.

One form of creep is a gradual variation over the lifetime of the SMA wire, due to physical changes in the SMA wire 31 and apparatus 1 over time. However this effect is so slow as to be irrelevant in the context of a single cycle. For example in a given camera 1, the local resistance maximum 60 and minimum 61 might be 12Ω and 10Ω after manufacture changing over the course of several hundred thousand cycles 20Ω and 15Ω but for any given cycle this drift is not significant.

However, there are other forms of creep caused by thermal effects which are more rapid and therefore affect the control. These effects will now be described with reference to SMA elements in general, but they apply also to the specific example of the SMA wire 31 in the camera 1.

A first effect is due to the electro-mechanical terminations of the SMA element (eg the SMA wire 31 in the camera 1) itself. The SMA element must be mechanically attached to the movable element and to some other mechanical support structure, typically a chassis or frame (at least one connection at each active end). The members making these mechanical connections (eg the mounting members 32 and the retaining element 41 in the camera 1) will in general have thermal conductivity and thermal capacity as well as mechanical strength.

On heating, the bulk of the SMA element heads towards a working temperature with time constant Tcs, and a corresponding shape change occurs in the bulk of the element, causing movement of the movable element. However, the mechanical connections sink heat from the SMA element causing the portions of SMA near the terminations (which may also be the electrical terminals) to be at a lower temperature than the bulk of the active SMA element. These portions of the SMA element can even fail to reach a temperature sufficient to cause the phase change and so experience no significant shape change, especially when first heated after a period of inactivity. After some period determined by the history of heating and by the total thermal conductivity of the members and the thermal capacity of the members, the members and hence the connected portions of the SMA element can begin to reach a temperature sufficient to cause the phase change, and over this period a corresponding shape change will occur in this portion of the SMA element. Similarly upon removing the external heating, the bulk of the SMA element will rapidly fall in temperature with the same time constant Tcs and stabilise, but now the thermal capacity and thermal conductivity of the members will tend to maintain a higher temperature in the connected portions of the SMA element. Thus the portions of the SMA element connected to members, although generally being only a small fraction of the total SMA element will experience a degree of contraction which lags that in the bulk of the SMA element. These changes will manifest as creep.

A second effect is caused by material other than the members connected to the SMA element with significant thermal mass that comes into close thermal contact with any section of the SMA element. Examples of such are: pulleys, guides or hooks around which the SMA element may by design be constrained to deform, to alter its direction in space in normal operation; and casings or frames of the SMA actuator system (or of the device in which the actuator is situated) which are in close proximity to the heated section of the SMA element. Such material will absorb heat from the SMA element when the latter is heated (and thus tend to cool proximal sections of the SMA element) and which will tends to dump heat to such proximal sections of the SMA element after the SMA element is otherwise cooled by cessation of the heating thus warming the SMA element. All such material will have in general different (and usually longer) thermal time-constants than the SMA element itself; and the thermal lags in both directions (heating and cooling) on sections of the SMA element will contribute to the observed creep in the actuator system.

A third effect is that convention currents will form in the fluid atmosphere (ie air) surrounding the SMA element, depending on the orientation relative to gravity. These currents will take significant time to form and build up after the onset of heating, and to be slow to cease after cessation of heating. Thus such currents will deliver and remove heat from the SMA element differently at different sections of the SMA element due to geometry and orientation. For example a vertical element aligned with gravity will produce a "chimney effect" whereby heat will be transported away from the lower sections and carried to the upper portions producing significant temperature differentials over significant time intervals across and along the SMA element. Conversely a horizontal element orthogonal to gravity will produce smaller and weaker convective effects and smaller temperature differentials. Such effects may be thought of as causing thermal dead-spots which can fail to reach a temperature sufficient to cause the phase change and so experience no significant shape change. Such thermal dead-spots might never reach the local temperature maximum 60 and so remain in a state having a positive temperature coefficient. Thus the thermal dead-spot contributes to the overall monitored resistance of the SMA actuator and may increase over time but without contributing any contraction to the SMA actuator. This is a source of creep if the monitored resistance is used to control the heating of the SMA actuator as in the camera 1. For example in practice it may be observed that if the control system attempts to maintain the resistance constant then there is creep in the actual position of the movable object. In the camera 1 for example, such an effect might cause creep in the position of the lens element 6 with a time constant measured of the order of seconds (typically 1 s to 10 s.

Some measures to combat creep are as follows. These measures are described with reference to the camera 1 but apply in general to any apparatus.

A first measure is the adjustment applied in step S11 to the stored focus value 80 to derive the target resistance value 83. In particular the adjustment is determined on the basis of the first resistance value Rmax1 of the local maximum resistance 72 stored in step S3 and the second resistance value Rmax2 of the local maximum resistance 83 stored in step S10. It is desired during the during the focus seek operation O2 to drive the lens element 6 to the position at which the lens element 6 was located corresponding to the stored focus value 80 during the focus scan operation O1. This needs to take account of the creep in position between (a) the time during the focus scan operation O1 when the lens element 6 had a resistance corresponding to the stored focus value 80 and (b) the time during the focus seek operation O2 when the lens element 6 reaches the target resistance value 83. Any creep occurring over the course of the focus scan operation O1 will result in a difference between the first resistance value Rmax1 and the second resistance value Rmax2. Accordingly the difference is also indicative of the creep occurring between the times (a) and (b). Therefore the necessary adjustment to take account on the creep may be based on the first resistance value Rmax1 and the second resistance value Rmax2.

The most significant term of the adjustment is the first resistance value Rmax1 minus the second resistance value Rmax2, this being approximately equal to the creep occurring between the times (a) and (b) because it is equal to the creep occurring between the detection of the first resistance value Rmax1 and the second resistance value Rmax2 in steps S3 and S10.

However, as the first resistance value Rmax1 and the second resistance value Rmax2 are detected at the beginning of the scan and seek steps S5 and S12 and does not take account of the creep over those scan and seek steps S5 and S12. The majority of the creep (assumed 1st order) will happen during the beginning of the scan step S5. These zones have high gain (strain/resistance) because a significant proportion of the SMA wire 31 has not reached the linear phase change region. As such, the required reduction in loop resistance can only be achieved with a relatively large (and coarse) increase in temperature and position. To compensate for this, the adjustment may be calculated with further term which varies across the range of contraction of the SMA actuator, for example by being dependant on the difference between the first resistance value Rmax1 of the local maximum resistance 72 and the stored resistance value 80.

Figure 14:
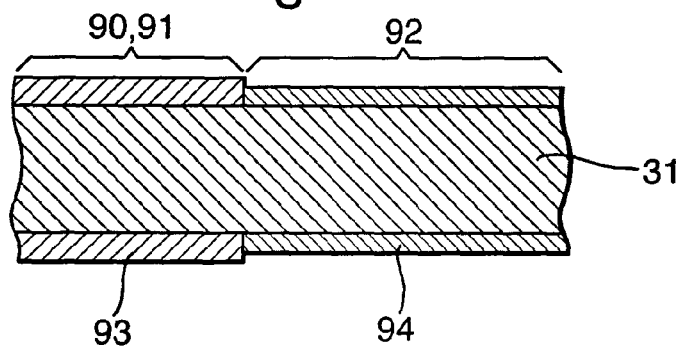
FIG. 14 is a cross-sectional view of the SMA wire having a coating.

A second measure is to provide a sheath of conductive material around certain portions of the SMA wire 31. This measure is shown in FIGS. 13 and 14, FIG. 13 being a view of the SMA actuator 30 showing the SMA wire 31 mechanically connected to the mounting members 32 by crimping and mechanically connected to the retaining element 41 (shown schematically) being hooked thereover, and FIG. 14 being a cross-sectional view. A sheath of electrically conductive material 93 is provided around first portions 90 of the SMA wire 31 in contact with, and extending from, the two mounting members 32 and a second portion 91 of the SMA wire 31 in contact with, and extending from, the retaining element 41. The first and second portions 90 and 91 of the SMA wire 31 are limited in extent (do not extend along the entire SMA wire 31) and no conductive material is provided on the remainder 92 of the SMA wire 31.

As shown in FIG. 14, the conductive material 93 makes an electrical connection with the SMA wire 31. When SMA material is exposed to air there rapidly forms an oxide coating 94 as shown on the remainder 93 of the SMA wire 31 in FIG. 14. In the portions 90 and 91, there is no such oxide coating 94 between the conductive material 93 and the SMA wire 31 in order to provide for electrical connection. This may be achieved by removing the oxide coating 94 prior to applying the conductive material 93. This may be achieved by dipping the SMA wire 31 in a suitable reagent. Thereafter the conductive material 93 is applied before the oxide coating 94 reforms. The application of the conductive material 93 may be performed in an inert atmosphere.

The sheath of conductive material 93 may be a coating applied by any suitable coating technique. Alternatively, the sheath of conductive material 93 may be a piece of material crimped around the SMA wire 31.

The conductive material 93 has a lower resistance per unit length of the SMA wire 31 than the SMA wire 31 itself, preferably by at least an order of magnitude. This easily achieved by selecting conductive material 93 having a resistivity which is lower than the SMA wire 31, preferably being at least 50 lower. Most ordinary metals easily meet this requirement. Accordingly the conductive material may be many metals, for example copper, gold or silver. For example in the case of the SMA wire 31 being Nitinol, the resistivity of the SMA wire 31 is of the order of 160 to 5000 times higher than that of ordinary metals. Even assuming the lowest resistivity ratio, the resistance of the conductive material 93 is an order of magnitude less than the resistance of the SMA wire 31 if the conductive material has a thickness of one-thirtieth of the radius of the SMA wire 31 which is easily achieved in the case of a coating. As the resistivity ratio increases the conductive material 93 may have even lesser thicknesses.

The conductive material 93 effectively forms a short to current along the portions 90 and 91 of the SMA wire 93, due to the conductive material being electrically connected to the SMA wire 93 and having a lower resistance. This reduces a major source of creep. In the absence of the conductive material, the portions 90 and 91 are a major source of creep as they act as thermal dead-spots due to the thermal interaction with the mounting members 32 and the retaining element 41, as discussed above. However, as a result of the conductive material 93 acting as a short, the portions 90 and 91 are not substantially heated and do not contract. Similarly the portions 90 and 91 do not substantially contribute to the monitored resistance of the SMA wire. Thus the creep arising from the portions 90 and 91 is significantly reduced. Given that the portions 90 and 91 do not contract, it is preferable to minimize their length subject to achieving the effect just described.

A similar measure may be applied to any location of the SMA wire 31, or indeed any location of an SMA element in general, which constitutes a thermal dead-spot due to thermal contact with other components.

A third measure is to select the thermal conductivity and thermal capacity of the members mechanically connected to the SMA wire 31 to be either as high as practically possible (so that heat from the SMA wire 31 is shunted away and causes only very small temperature rise through contact with the heated SMA wire 31, and thus the temperature of essentially the whole SMA wire 31 reaches a stable value as quickly as possible), or as low as practically possible (so that heat from the SMA wire 31 is not much shunted away and significant and fast heating of the members through contact with the heated SMA wire 31 occurs and thus again the temperature of essentially the whole SMA wire 31 reaches a stable value as quickly as possible. For the case of members making an electrical connection with the SMA wire, ie the mounting members 32, as good electrically conducting and thermally poorly conducting and thermally low-specific-heat materials are rare and or expensive and or difficult to work with, the first approach may be easier to implement. Advantageously, the thermal capacity of the mounting members 32 may be chosen to be at least ten times and preferably 30 times and more preferably 100 times that of the thermal capacity of the adjacent section of the SMA wire 31 which is well thermally coupled thereto. In the case of members not electrically connected to the SMA wire 31, ie the retaining element 41, there are many low thermal capacity/conductivity material options to choose from, e.g. thin walled plastic or ceramic sections are well suited here, although in the case of hooks, metals can be used for the high-thermal property options.

A fourth measure is to similarly select the thermal conductivity and thermal capacity of all elements in good thermal contact with the SMA wire 31.

A fifth measure is to arrange that wherever proximal materials not in contact by design with the SMA wire 31 might pick up heat from and return heat to the SMA wire 31 they are either made highly reflective to thermal radiation (especially if they are not good sinks for heat), or highly absorbent to thermal radiation (especially if they are good sinks); and/or the proximity of such materials to the SMA wire 31 is minimised by design. In this way, thermal lag effects on the temperature and thus actuation of the SMA wire 31 are reduced allowing for tighter positional control.

A sixth measure is to provide means for reducing the fluid convection currents around a heated SMA wire 31 in order better to control the temperature of and temperature gradients along and across the SMA wire 31. Such means include: baffles arranged around but not in direct contact with the SMA wire 31 in such a way as to thwart easy convective fluid flow, for example being primarily oriented across the principle flow direction where this is known (generally only in the case of a fixed-orientation actuator); area and space filling materials with very small thermal capacity, heat resistance, and very low stiffness (eg fine glass wool) may be usefully placed around the SMA wire 31 to thwart smooth convective fluid flow in any direction/orientation, care needing to be taken to ensure that the SMA wire 31 can still cool down on cessation of heating in a reasonable time for the application; in certain applications a small controlled flow of the surrounding fluid (eg from a fan or pump) can be deliberately caused to run over the surface of the SMA wire 31 sufficient to disrupt significant convective flow build-up, and in this way unwanted thermal lags removed from the system;

There will now be considered measures for reducing failure of the SMA wire 31. In the case of a camera, it is desirable for the SMA actuator 30 to have a long life time, typically of the order of hundreds of thousands or even millions of cycles. However, failure of the SMA wire 31 can occur, this being a particular problem as the diameter of the SMA wire is reduced. Most commercial mass-produced consumer applications use relatively thick SMA wire of diameter around 75 μm or above. However as discussed above, the camera 1 uses SMA wire 31 which is desirably thinner in order to improve the speed of response, typically being at most 35 μm. It has been appreciated that such thin SMA wire 31 can lead to fracture of the SMA material at or very close to the mechanical connections made to the SMA wire 31, even when known precautions are taken into consideration.

Experiments carried out using known crimped SMA parts show a surprisingly high number of life-test failures of the SMA element adjacent to the crimp, sometimes as many as 10% of the samples tested for more than 50,000 cycles. On the basis of careful examination of the parts that survive and the parts that fail, experiments with countermeasures, and analysis of the assemblies before and after successful test and test-to-failure, it is hypothesized that the principal cause of such early failures is buckling of the thin SMA element where it emerges from the crimped connection possibly initiated by tiny surface "nicking" of the SMA wire. One cause of the budding (and perhaps also of the surface nicking) is the dynamical forces exerted on the SMA wire by relative motion of the SMA wire and the member to which it is crimped, this in turn being caused by the relatively high weight of the member relative to strength of the SMA wire. With conventional thicker SMA wires such dynamical forces are small relative to the strength of the SMA wire and cause few problems. However as they diameter of the SMA wire reduces, say to values of 60 μm or less, such forces can easily produce damage even when the crimps at the SMA element ends are quite small (eg 300 μum thick brass of width a few 100 μm).

There is also some evidence that a further contribution to early fatigue failure is steep temperature gradients within the SMA wire at the crimping locations due primarily to the very different thermal conductivity coefficients of the material of the member and the normally surrounding air at either side.

Some measures to combat such failure are as follows. These measures are described with reference to the camera 1 but apply in general to any apparatus.

Figure 15:
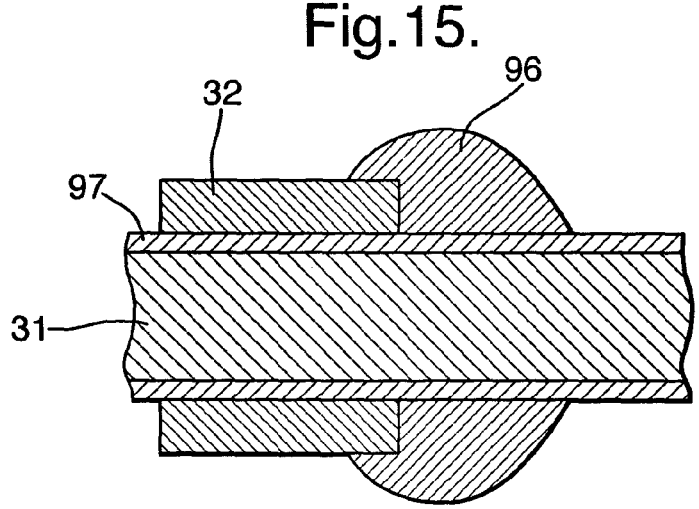
FIG. 15 is a cross-sectional view of the SMA wire having an applied supporting material.

A first measure is to apply additional material 96 over the SMA wire 31 and in contact (at least tensile contact) with the mounting member 32 to which the SMA wire is connected, as shown in FIG. 15. The purpose of the additional material 96 is to reduce the mechanical stresses in the SMA wire 31 by supporting the SMA wire 31 relative to the mounting member 32. This increases the lifetime of the SMA wire 31, probably by reducing the above-discussed causes of fatigue of buckling and nicking of the SMA wire 31 at the location where the SMA wire 31 is connected to the mounting member 32. The additional material 96 may also increases the lifetime of the SMA wire 31 by reducing the thermal stresses in the SMA wire 31.

The additional material 96 desirably extends entirely around the SMA wire 31 and for a distance along the SMA wire 31 from the mounting member, for example at least once, or preferably at least twice or three times the diameter of the SMA wire 31. However, the additional material 96 is limited in extent and extends along only part of the length of the SMA wire 31.

The additional material 96 may be applied over a coating 97 on the SMA wire 31, which coating 97 may be an oxide coating 94 or a coating of conductive material 93 as described above.

The additional material 96 may be formed by any material capable of providing support. One simple implementation is for the additional material to be an adhesive, desirably a thermosetting adhesive such as a cyanoacrylate adhesive or an epoxy adhesive which has good strength properties. Adhesive is easy to apply, simply by depositing an amount of adhesive to the exit joint of the SMA wire 31 from the mounting member 32. Adhesive is also robust once set.

Another consideration is that the total amount (mass) of such additional material 96 should be kept as small as possible consistent with adequately performing the desired stress-relieving function, because it is found in practice that adding any such additional material 96 inevitably adds mass which is inactive in the sense of non-contributory to the desired mechanical actuator effect and providing a concomitant increase in creep as described above. For a given mass of additional material 96, it is preferable in terms of reducing the creep to increase the thermal conductivity.

A second measure is to handle the SMA actuator 30 carefully, as follows.

Firstly rapid accelerations of one end of the SMA actuator 30 relative to the other are minimised in all circumstances where the SMA wire 31 itself may become taut (as opposed to slack), including preventing one end from dropping under its own weight and then being arrested in its fall by the SMA wire 31, the forces to which the SMA wire 31 is exposed being kept smaller than its breaking or kink-strength (bearing in mind that a dangling mounting member 32 will not in general hang such that the SMA wire 31 exits orthogonally. One method to avoid such rapid accelerations is to pick up both ends simultaneously such that the SMA wire 31 experiences forces associated only with its own weight, and not with the weight of the mounting members (co-moving handling).

Secondly tensioning the SMA element to a significant fraction of its normal working strain limit (say no more than 30% but more preferably no more than 20% and even more preferably no more than 10% thereof) is avoided in a direction more than a few degrees off normal to the exit direction of the SMA wire 31 from the mounting member 32 against which the tension is generated. This avoids the buckling effect at the wire exit and also the forcing of the SMA wire 31 to conform to the edge of shape/form of the mounting member 32, which in general can be of quite small radius comparable to the diameter of the SMA wire 31.

A third measure is to minimise the sharpness of the edges of the mounting member 32, preferably such edges having a radius greater than the diameter of the SMA wire 31, preferably at least by two, four, six or ten times. Such a radius should desirably be maintained at a significant fraction of these values after crimping (during which significant crushing of the material may occur) to avoid reduction of the protective function. In this way, tension in the SMA wire 31 will cause less buckling or nicking. A variant on this measure is to make one or both of the mating crimp surfaces that come together to be non planar, in particular curved away from each other at their mating edges upon crimping, so that after crimping, the SMA wire 31 is gripped firmly by the middle portions of the two mating surfaces but not at all at the outer edges.

This might be termed a "fluted" crimp. However in this implementation care is needed to ensure that the transition region from firmly crimped to uncrimped is short (at most a very one or a few times the diameter of the SMA wire 31) to prevent a significant region of rubbing/scraping in the transition region which would likely damage the SMA wire 31 during repeated actuation.

A fourth measure is to arrange the mechanics and geometry of the camera 1 such that when the crimped ends of the SMA actuator 30 are assembled and whenever the SMA wire 31 is in tension, then the directional positions in space of the edges of the two mounting members 32 from which the SMA wire 31 exits are close to or actually parallel (within a few degrees) to each other and that both are normal (to within a few degrees) to the direction in space of the line of the taut SMA wire 31. Again this avoids the buckling or nicking forces on the SMA wire 31.

A fifth measure involves the material properties of the mounting members 32. For crimping of SMA wire it is common to use half-hard brass and phosphor bronze, as well as nickel-plated metal and other metal materials here. However it has been found by close examination with a Scanning Electron Microscope that such materials can often be hard enough separately or in combination to make small nicks or produce other damage in fine SMA wires, even when crimped with normal due care, either during the crimping operation itself, or thereafter due to handling induced or use-induced forces combined with the unyielding nature due to the material hardness. Thus this fifth measure to use materials for the crimping mounting members 32 soft enough to avoid such damage to the SMA wire 31. Some specific materials are brass or phosphor-bronze (or other common crimp metal) one or more grades softer than is normal to use for crimping SMA elements, subject to the hardness still being adequate to provide crimp reliability, in terms of gas-tight joints, pull-out strength, and electrical termination reliability. With clamps as opposed to crimps (where the clamping force is produced independently of the fold-strength of the clamp material) it is possible and preferable to use even softer materials than the optimally soft material for crimps.

Another variant is to use the common materials used for crimping/clamping SMA elements but to first heat-treat those materials to soften them enough to avoid the problems described here, before the crimping/clamping operation is completed, but possibly after the crimp/clamp component parts themselves are formed and/or plated. Specifically in the case of plating with hard materials such as nickel, the heat-treatment can only usefully be carried out after the plating operation.

Another variant is to make the crimp/clamp parts out of at least two component materials, the outer material being hard and stiff enough to provide the rigidity required for good crimping/clamping of the SMA wire 31, and the inner material making physical contact with the SMA wire 31, and isolating it mechanically from the outer material, being soft enough to avoid any crimp/clamp or subsequent handling damage to the SMA wire 31. One such combination is nickel plated half-hard brass outer material (and perhaps gold on top) with tin-lead inner material (eg solder). It is preferable to make such inner material hard enough to provide the described mechanical protection functions as otherwise pull-out strength of the crimp/clamp is reduced, and if such inner material is very soft, it is possible that the crimping/clamping process will not strip off the oxide coating during the process rendering the electrical contact function unreliable or useless.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:

1. A method of controlling an SMA actuator apparatus comprising an SMA actuator arranged on contraction due to heating to drive movement of a movable element, in which method heating of the SMA actuator is performed by passing a current through the SMA actuator, the method comprising:
   a first heating step of heating the SMA actuator from a state in which it is not contracted, whilst monitoring the resistance of the SMA actuator, until a first maximum in the resistance of the SMA actuator is detected, the resistance value of the first maximum being stored;
   a scan step of further heating the SMA actuator to cause the SMA actuator to contract, whilst monitoring a signal which varies with the position of the movable element, the value of the resistance of the SMA actuator when the signal is at an acceptable level being measured and stored;
   a cooling step of cooling the SMA actuator back into a state in which it is not contracted;
   a second heating step of heating the SMA actuator, whilst monitoring the resistance of the SMA actuator, until a second maximum in the resistance of the SMA actuator is detected;
   deriving a target resistance value equal to the stored value of the resistance of the SMA actuator when the signal is at an acceptable level adjusted by an adjustment which is determined on the basis of the resistance values of the first and second maximums; and
   a seek step of further heating the SMA actuator, whilst monitoring the resistance of the SMA actuator, until the monitored resistance value reaches the target resistance value.

2. A method according to claim 1, wherein the adjustment has a most significant term equal to the resistance value of the second maximum minus the resistance value of the first maximum.

3. A method according to claim 2, wherein the adjustment is calculated with further term Which varies across the range of contraction of the SMA actuator.

4. A method according to claim 3, wherein the further term is dependant on the difference between the resistance value of the first maximum and the value of the resistance of the SMA actuator when the signal is at an acceptable level.

5. A method according to claim 1, wherein during said seek step the power of the current passed through the SMA actuator is varied using a feedback control technique in which the measured resistance of the SMA actuator as a feedback signal to drive the measured resistance to the target resistance value.

6. A method according to claim 5, wherein during said seek step the current passed through the SMA actuator is pulse-width modulated, the current being varied by varying the duty cycle of the pulse-width modulated current.

7. A method according to claim 1, wherein during the cooling step the resistance of the SMA actuator is monitored and the actuator is cooled until the resistance of the SMA actuator passes through a maximum.

8. A method according to claim 1, wherein during the scan step the resistance of the SMA actuator is monitored and, for each of a series of successively decreasing test resistance values, the SMA actuator is heated until the monitored resistance value reaches the test resistance value, the signal being monitored at each of the test resistance values.

9. A method according to claim 8, wherein during said scan step the power of the current passed through the SMA actuator is varied using a feedback control technique in which the measured resistance of the SMA actuator as a feedback signal to drive the measured resistance to the series of test resistance values.

10. A method according to claim 1, wherein the movable element is a camera lens element along the optical axis to change the focus of the camera lens element on an image sensor, and the signal is a measure of the quality of focus of the image signal output by the image sensor.

11. A method according to claim 10, wherein the camera lens element includes one or more lenses having a diameter of at most 10 mm.

12. A control system for an SMA actuator apparatus comprising an SMA actuator arranged on contraction due to heating to drive movement of a movable element, the control system comprising:
   a current source operable to pass current through the SMA actuator to heat the SMA actuator;
   a detector circuit operable to detect the resistance of the SMA actuator; and
   a controller arranged to control the current source, the controller being responsive to the resistance of the SMA actuator detected by the detector circuit, wherein the controller is operative to perform an operation comprising:
   a first heating step of controlling the current source to heat the SMA actuator from a state in which it is not contracted, whilst monitoring the resistance of the SMA actuator, until a first maximum in the resistance of the SMA actuator is detected, the resistance value of the first maximum being stored;
   a scan step of controlling the current source to further heat the SMA actuator to cause the SMA actuator to contract, whilst monitoring a signal which varies with the position of the movable element, the value of the resistance of the SMA actuator when the signal is at an acceptable level being measured and stored;
   a cooling step of controlling the current source to cool the SMA actuator back into a state in which it is not contracted;
   a second heating step of controlling the current source to heat the SMA actuator, whilst monitoring the resistance of the SMA actuator, until a second maximum in the resistance of the SMA actuator is detected;
   deriving a target resistance value equal to the stored value of the resistance of the SMA actuator when the signal is at an acceptable level adjusted by an adjustment which is determined on the basis of the resistance values of the first and second maximums; and
   a seek step of controlling the current source to further heat the SMA actuator, whilst monitoring the resistance of the SMA actuator, until the monitored resistance value reaches the target resistance value.

13. A control system according to claim 12, wherein the adjustment has a most significant term equal to the resistance value of the second maximum minus the resistance value of the first maximum.

14. A control system according to claim 13, wherein the adjustment is calculated with further term which varies across the range of contraction of the SMA actuator.

15. A control system according to claim 14, wherein the further term is dependant on the difference between the resistance value of the first maximum and the value of the resistance of the SMA actuator when the signal is at an acceptable level.

16. A control system according to claims 12, wherein during said seek step the controller is operative to vary the power of the current passed through the SMA actuator using a feedback control technique in which the measured resistance of the SMA actuator as a feedback signal to drive the measured resistance to the target resistance value.

17. A control system according to claim 12, wherein during the scan step the controller is operative to monitor the resistance of the SMA actuator and, for each of a series of successively decreasing test resistance values, the SMA actuator is heated until the monitored resistance value reaches the test resistance value, the signal being monitored at each of the test resistance values.

18. A control system according to claim 17, wherein during said scan step the controller is operative to vary the power of the current passed through the SMA actuator using a feedback control technique in which the measured resistance of the SMA actuator as a feedback signal to drive the measured resistance to the series of test resistance values.

19. A control system according to claim 12, wherein the movable element is a camera lens element along the optical axis to change the focus of the camera lens element on an image sensor, and the signal is a measure of the quality of focus of the image signal output by the image sensor.

20. A control system according to claim 19, wherein the camera lens element includes one or more lenses having a diameter of at most 10 mm.

* * * * *